(12) United States Patent
Nomura et al.

(10) Patent No.: US 11,586,301 B2
(45) Date of Patent: Feb. 21, 2023

(54) POINTER POSITION DETECTION METHOD AND SENSOR CONTROLLER

(71) Applicant: Wacom Co., Ltd., Saitama (JP)

(72) Inventors: Yoshio Nomura, Saitama (JP); Thilo Naoki Hornung, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/543,606

(22) Filed: Dec. 6, 2021

(65) Prior Publication Data

US 2022/0091686 A1  Mar. 24, 2022

Related U.S. Application Data

(63) Continuation of application No. 17/159,995, filed on Jan. 27, 2021, now Pat. No. 11,194,410.

(30) Foreign Application Priority Data

Mar. 16, 2020 (JP) .............................. JP2020-045393

(51) Int. Cl.
*G06F 3/0354* (2013.01)
*G06F 3/041* (2006.01)
*G06F 3/01* (2006.01)
*G06F 3/044* (2006.01)

(52) U.S. Cl.
CPC .......... *G06F 3/03545* (2013.01); *G06F 3/017* (2013.01); *G06F 3/0442* (2019.05); *G06F 3/04162* (2019.05)

(58) Field of Classification Search
CPC ............... G06F 3/03545; G06F 3/0442; G06F 3/04162; G06F 3/017; G06F 2203/04114; G06F 3/04186
See application file for complete search history.

(56) References Cited

U.S. PATENT DOCUMENTS 11,068,118 B2   7/2021  Rosenburg et al.
2011/0205163 A1*  8/2011  Hinckley .............. G06F 3/0483
                                                                        345/173

(Continued)

FOREIGN PATENT DOCUMENTS

GB         2590763 A        7/2021
JP         2019-61725 A     4/2019
WO         WO-2018225204 A1 * 12/2018 ......... G06F 3/03545

*Primary Examiner* — Michael Pervan
(74) *Attorney, Agent, or Firm* — Seed IP Law Group LLP

(57) ABSTRACT

Disclosed is a pointer position detection method for detecting, using a touch sensor including a plurality of sensor electrodes, a touch position indicated by a passive pointer that does not transmit a signal and a pen position indicated by an active pen configured to transmit a downlink signal from a pen electrode disposed in a distal end of the active pen, the pointer position detection method performed by a sensor controller connected to the touch sensor. The pointer position detection method includes: detecting one or more candidate pen positions based on a level of the downlink signal in each of the plurality of sensor electrodes; determining the pen position in an active region at least partially surrounded by a bezel region of a display device from the one or more candidate pen positions; and detecting a gesture performed by the active pen in the bezel region of the display device.

8 Claims, 16 Drawing Sheets

(56) References Cited

U.S. PATENT DOCUMENTS

| | | | |
|---|---|---|---|
| 2011/0209088 A1* | 8/2011 | Hinckley | G06F 3/0488 |
| | | | 715/810 |
| 2011/0209093 A1* | 8/2011 | Hinckley | G06F 3/04883 |
| | | | 715/834 |
| 2011/0209097 A1* | 8/2011 | Hinckley | G06F 3/04883 |
| | | | 715/863 |
| 2011/0209098 A1* | 8/2011 | Hinckley | G06F 3/0483 |
| | | | 715/863 |
| 2011/0209099 A1* | 8/2011 | Hinckley | G06F 3/04883 |
| | | | 715/863 |
| 2012/0013555 A1 | 1/2012 | Maeda et al. | |
| 2014/0022183 A1* | 1/2014 | Ayoub | G06F 3/04883 |
| | | | 345/173 |
| 2014/0078101 A1 | 3/2014 | Katsurahira | |
| 2014/0313156 A1* | 10/2014 | Tenuta | G06F 3/04883 |
| | | | 345/174 |
| 2017/0269827 A1* | 9/2017 | Choi | G06F 3/04845 |
| 2019/0235646 A1* | 8/2019 | Karsuntsev | G06F 3/03545 |
| 2020/0081577 A1* | 3/2020 | Nomura | G06F 3/0442 |
| 2021/0124449 A1 | 4/2021 | Jang et al. | |

\* cited by examiner

FIG.6A

| CANDIDATE PEN POSITION | DEFINITIVE PEN POSITION | VALID FLAG |
|---|---|---|
| cP[0]=(x0,y0) | fP[0]=NULL | INVALID |
| cP[1]=(x1,y1) | fP[1]=NULL | INVALID |
| ⋮ | ⋮ | ⋮ |

FIG.6B

| CANDIDATE TOUCH POSITION | DEFINITIVE TOUCH POSITION | VALID FLAG | REGION TYPE |
|---|---|---|---|
| cT[0]=(x0,y0) | fT[0]=NULL | INVALID | - |
| cT[1]=(x1,y1) | fT[1]=cT[1] | INVALID | PALM |
| cT[2]=(x2,y2) | fT[2]=cT[2] | VALID | FINGER |
| ⋮ | ⋮ | ⋮ | ⋮ |

FIG. 12

| | LINEAR GESTURES | | MULTIDIRECTIONAL GESTURES | |
|---|---|---|---|---|
| EXAMPLES OF GESTURES | ↕ | ↔ | ↻ | ✕ / ↑↑(1,2) |
| EXAMPLES OF ALLOCATED COMMANDS | BRUSH SIZE +/−<br>CONTRAST +/−<br>R/L SCROLL +/− | U/D SCROLL +/−<br>BRUSH SHARPNESS +/−<br>CANVAS ROTATION AMOUNT +/− | SAVE FILE<br>SWITCH TOOLS<br>SET SCREEN MAGNIFICATION TO 100%<br>INVERSE IMAGE | |

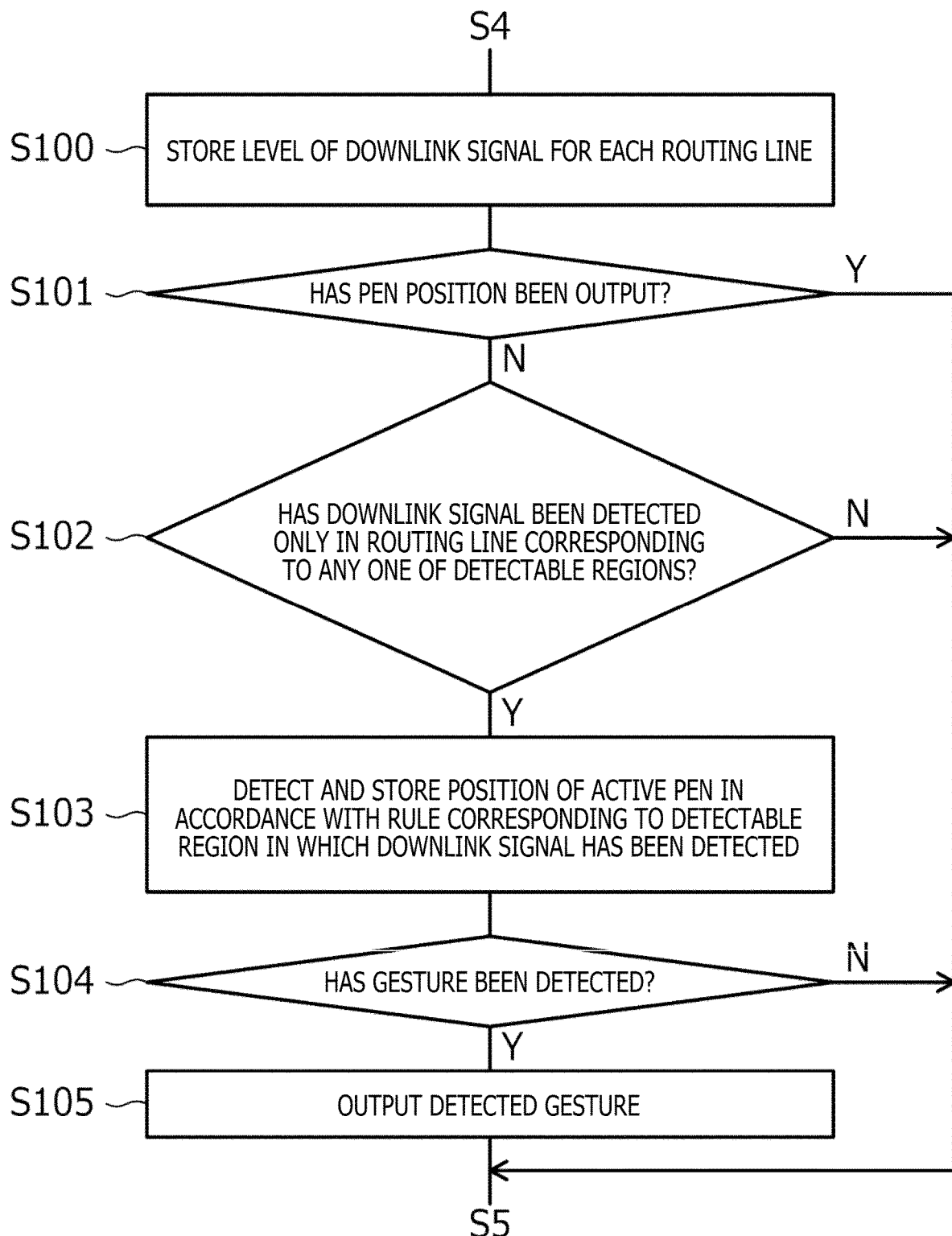

POINTER POSITION DETECTION METHOD AND SENSOR CONTROLLER

BACKGROUND

Technical Field

The present disclosure relates to a pointer position detection method and a sensor controller, and, in particular, to a pointer position detection method and a sensor controller for detecting the positions of an electronic pen using an active capacitance method (hereinafter referred to as an "active pen") and a passive pointer such as a finger.

Background Art

An input system supporting both an input using an active pen and an input using a passive pointer is known. Hereinafter, an input using an active pen will be referred to as a "pen input" while an input using a passive pointer will be referred to as a "touch input." In order to detect the passive pointer in response to a touch input, such an input system uses a capacitive method, which utilizes a change in capacitance in a touch sensor.

Japanese Patent Laid-open No. 2019-061725 (hereinafter referred to as "Patent Document 1") discloses an example of this type of input system. An issue specific to this type of input system is that the contact position of the active pen is misrecognized as the contact position of the passive pointer, and vice versa. The input system disclosed in Patent Document 1, therefore, performs processes for solving this issue. Specifically, in the input system, among one or more touch positions (positions indicated by the passive pointer) detected, any touch position substantially equal to a pen position (position indicated by the active pen) detected immediately before the detection of the one or more touch positions is excluded from output targets. Moreover, among one or more pen positions detected, any pen position substantially equal to a touch position having a predetermined size or greater among one or more touch positions detected immediately before the detection of the one or more pen positions is excluded from output targets.

BRIEF SUMMARY

A touch sensor included in the above-described input system includes a touch region and a peripheral region surrounding the touch region. In the touch region, a plurality of sensor electrodes are disposed in a matrix. In the peripheral region, a plurality of routing lines are disposed so as to respectively connect corresponding ones of the plurality of sensor electrodes to the sensor controller.

The sensor controller is not supposed to detect a pen position when a pen tip of the active pen is in the peripheral region. On some occasions, however, a downlink signal is received in a routing line, resulting in the acquisition of both the X- and Y-coordinates. In such cases, even though the pen tip of the active pen is in the peripheral region, the sensor controller detects a pen position in the touch region. This is nothing more than a false detection, which requires improvement.

Therefore, it is desirable to provide a pointer position detection method and a sensor controller that can prevent a pen position from being detected in the touch region when the pen tip of the active pen is actually in the peripheral region.

In the input system described above, various menus, such as a scroll bar, are crammed in the touch region (or in a display region corresponding to the touch region). These menus, which are usually assumed to be operated with a mouse, are often too small to be operated by a pen input. As a result, the input system faces many erroneous operations caused by pen inputs, which requires further improvement.

Therefore, it is also desirable to provide a pointer position detection method and a sensor controller that can reduce occurrence of erroneous operations caused by pen inputs.

According to a first aspect of the present disclosure, there is provided a pointer position detection method for detecting, using a touch sensor including a plurality of sensor electrodes, a touch position indicated by a passive pointer that does not transmit a signal and a pen position indicated by an active pen configured to transmit a downlink signal from a pen electrode disposed in a distal end of the active pen. The pointer position detection method is performed by a sensor controller connected to the touch sensor and includes detecting one or more candidate touch positions by detecting one or more changes in capacitances in the touch sensor, detecting one or more candidate pen positions based on a level of the downlink signal in each of the plurality of sensor electrodes, and determining the pen position from the one or more candidate pen positions. Each of the one or more candidate pen positions corresponding to a candidate touch position that has not been detected by the detecting one or more candidate pen positions is not determined as the pen position by the determining the pen position.

According to a second aspect of the present disclosure, the pointer position detection method according to the first aspect further includes detecting a gesture performed by the active pen in a bezel region of a display device.

According to the first aspect of the present disclosure, there is provided a sensor controller that is connected to a touch sensor including a plurality of sensor electrodes and is configured to detect, using the touch sensor, a touch position indicated by a passive pointer that does not transmit a signal and a pen position indicated by an active pen configured to transmit a downlink signal from a pen electrode disposed in a distal end of the active pen. The sensor controller includes a processor, and a memory storing instructions that, when executed by the processor, cause the sensor controller to detect one or more candidate touch positions by detecting one or more changes in capacitances in the touch sensor, detect one or more candidate pen positions based on a level of the downlink signal in each of the plurality of sensor electrodes, and determined the pen position from the one or more candidate pen positions. Each of the one or more candidate pen positions corresponding to a candidate touch position that has not been detected is not determined as the pen position.

According to the second aspect of the present disclosure, in the sensor controller according to the first aspect, the instructions, when executed by the processor, cause the sensor controller to perform detect a gesture performed by the active pen in a bezel region of a display device.

According to the first aspect of the present disclosure, any candidate pen position corresponding to a candidate touch position has not been detected is not determined as the pen position. This configuration can prevent a pen position from being detected in a touch region when a pen tip of the active pen is actually in a peripheral region.

According to the second aspect of the present disclosure, various menus can be operated by gestures performed in the bezel region. This configuration can reduce occurrence of erroneous operations caused by pen inputs.

BRIEF DESCRIPTION OF THE DRAWINGS

FIG. 6A illustrates a candidate pen position table for storing candidate pen positions.

FIG. 6B illustrates a touch position table for storing candidate touch positions;

FIG. 12 is a table illustrating an example of specific types of gestures and commands allocated to the gestures;

FIG. 16 is a flowchart illustrating a gesture detection process performed by the sensor controller according to a second embodiment of the present disclosure.

DETAILED DESCRIPTION OF THE PREFERRED EMBODIMENTS

Hereinafter, embodiments of the present disclosure will be described in detail with reference to the accompanying drawings.

Figure 1:
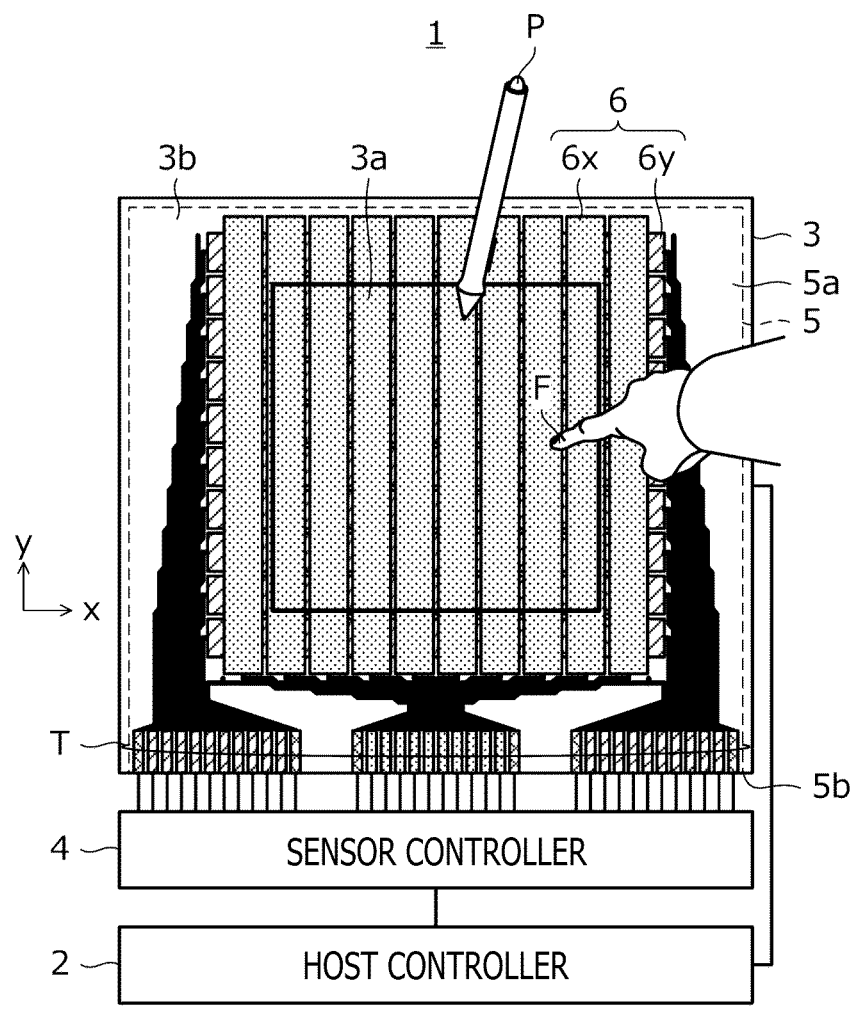
FIG. 1 is a diagram illustrating a configuration of an electronic device according to a first embodiment of the present disclosure.

FIG. 1 is a diagram illustrating a configuration of an electronic device 1 according to a first embodiment of the present disclosure. FIG. 1 also illustrates an active pen P and a finger F. The active pen P is used to perform a pen input. The finger F serves as a passive pointer used to perform a touch input. Hereinafter, the active pen P and the finger F may be occasionally collectively referred to as a "pointer." The electronic device 1 according to the present embodiment is, for example, a tablet computer and includes a host controller 2, a display device 3, a sensor controller 4, and a touch sensor 5, as illustrated in FIG. 1.

The active pen P is an electronic pen that operates using an active capacitance method. Although not illustrated, a control circuit and a transmission and reception circuit are provided inside the active pen P. The control circuit can transmit and receive signals to and from the electronic device 1 via the transmission and reception circuit. Hereinafter, a signal transmitted from the electronic device 1 to the active pen P will be referred to as an "uplink signal US," while a signal transmitted from the active pen P to the electronic device 1 will be referred to as a "downlink signal DS."

A pen electrode is disposed in a distal end of the active pen P. The transmission and reception circuit of the active pen P receives the uplink signal US and transmits the downlink signal DS via capacitance formed between the pen electrode and each sensor electrode 6 (described later) included in the touch sensor 5. The pen electrode for receiving the uplink signal US may be different from or identical to the pen electrode for transmitting the downlink signal DS.

The active pen P also includes a pen pressure detection circuit, a side switch state detection circuit, a storage device (memory), and a power supply device (battery). The pen pressure detection circuit detects pressure (pen pressure) applied to a pen tip of the active pen P. The side switch state detection circuit detects an on/off state of a side switch disposed on a side surface of the active pen P. The storage device (memory) stores a unique ID preliminarily allocated. The power supply device (battery) supplies operation power of the active pen P. The control circuit of the active pen P can control each of these components.

The downlink signal DS includes a position signal and a data signal. The position signal is a burst signal with a predetermined frequency. The data signal includes data to be transmitted from the active pen P to the electronic device 1. The position signal is used to detect the position of the active pen P in the electronic device 1. For example, the data transmitted from the data signal includes data (pen pressure data) indicating the pen pressure detected by the pen pressure detection circuit, data (switch data) indicating the on/off state of the side switch detected by the side switch state detection circuit, and the unique ID stored in the storage device. These data are arranged in the data signal by the control circuit.

The uplink signal US includes a predetermined start bit and a command indicating an instruction from the electronic device 1 to the active pen P. The control circuit of the active pen P can extract the command from the received uplink signal US, decode the command, and insert data corresponding to the contents of the command into the data signal. Accordingly, the electronic device 1 can extract desired data from the active pen P.

The host controller 2 is a computer including a processor and a memory (neither is illustrated). The processor of the host controller 2 reads and executes programs stored in the memory to perform various processes such as control of the components of the electronic device 1 including the display device 3 and the sensor controller 4, and execution of various applications including a drawing application. The memory of the host controller 2 includes a main memory, such as dynamic random-access memory (DRAM), and an auxiliary storage device, such as a flash memory, and stores data necessary for the processor to execute the programs and various data generated by the processor as a result of the execution of the programs. For example, the memory of the host controller 2 stores instructions that, when executed by the processor, cause the host controller 2 to perform the processes described herein.

The display device 3 includes a display panel and a drive circuit (neither is illustrated). The display panel includes a plurality of pixels disposed in a matrix. The drive circuit performs a desired display by driving the display panel. For example, the display device 3 includes a liquid crystal display, an organic electro-luminescence (EL) display, or an electronic paper. A display region 3a and a bezel region 3b are provided on a surface of the display panel. The display region 3a is a region in which the plurality of pixels are disposed. The bezel region 3b is a region in which the drive circuit and routing traces are disposed. The routing traces connect the pixels in the display region 3a to the drive circuit. The drive circuit can drive each pixel of the display panel under the control of the host controller 2.

The sensor controller 4 and the touch sensor 5 function as input devices for the host controller 2. The touch sensor 5 includes the plurality of sensor electrodes 6 each connected to the sensor controller 4. The plurality of sensor electrodes 6 include a plurality of linear electrodes 6x and a plurality of linear electrodes 6y. The plurality of linear electrodes 6x extend in a y direction illustrated in FIG. 1 and are disposed at equal intervals in an x direction illustrated in FIG. 1. The plurality of linear electrodes 6y extend in the x direction and are disposed at equal intervals in the y direction.

In one example, the plurality of sensor electrodes 6 included in the touch sensor 5 are disposed between a glass plate constituting a touch surface 5a of the touch sensor 5 and the display panel of the display device 3. Either the plurality of linear electrodes 6x or the plurality of linear electrodes 6y may be commonly used as common electrodes (not illustrated) in the display panel, and the electronic device 1 configured in this manner is called an "in-cell type." While ten linear electrodes 6x and ten linear electrodes 6y are illustrated in FIG. 1 and subsequent figures to simplify illustration, a greater number of linear electrodes 6x and 6y are disposed in actual implementation.

The touch sensor 5 has a rectangular perimeter. Along an edge 5b of the rectangular perimeter, a plurality of FPC connection terminals T are disposed side by side. Each of the plurality of sensor electrodes 6 is connected to the sensor controller 4 via at least one of the FPC connection terminals T. The sensor controller 4 is formed on a flexible printed circuit (FPC) board, not illustrated.

Figure 2:
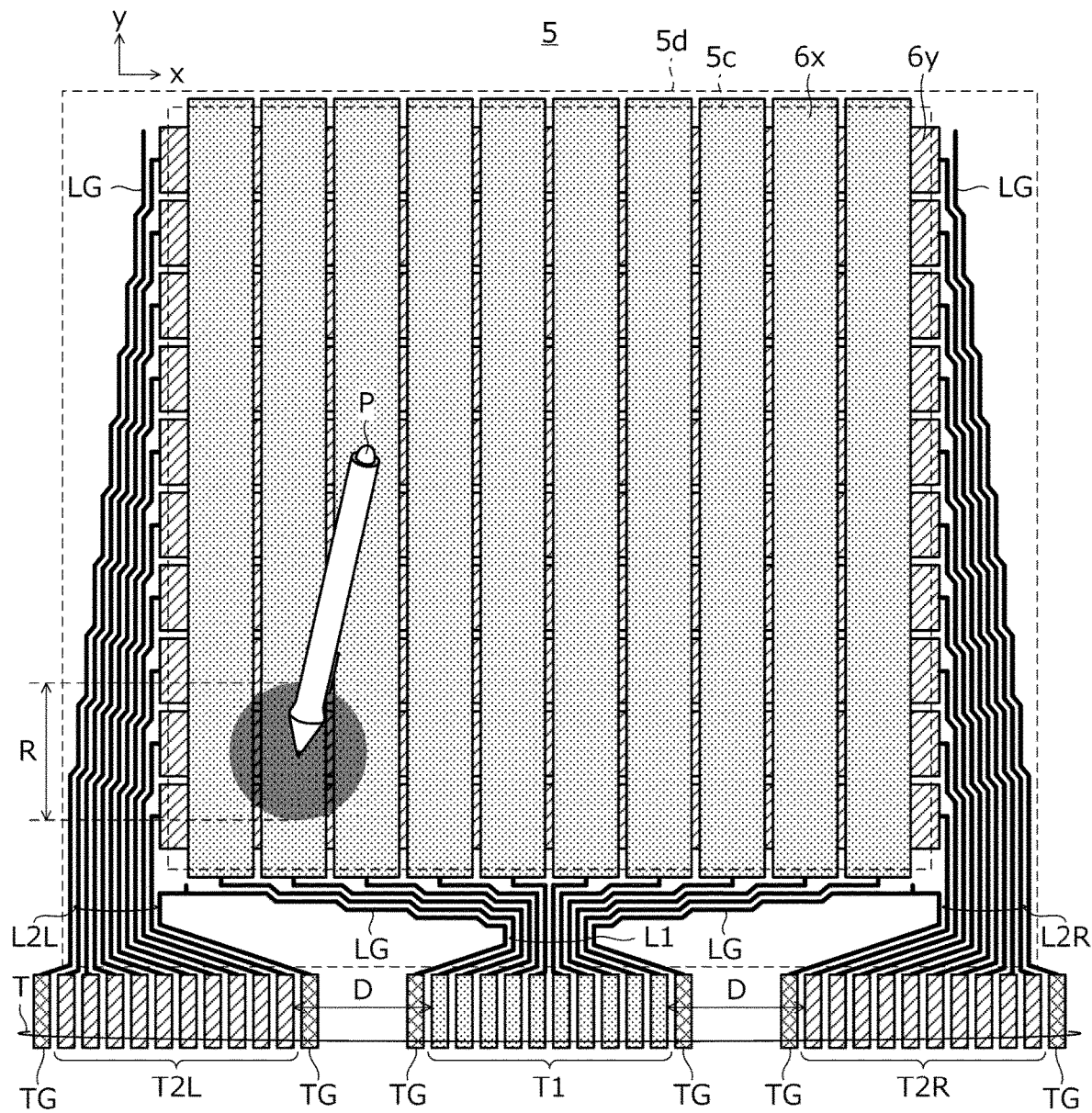
FIG. 2 is an enlarged view of a touch sensor illustrated in FIG. 1.

FIG. 2 is an enlarged view of the touch sensor 5. To facilitate understanding, FIG. 2 illustrates only part of the components actually provided in the touch sensor 5. Referring now to FIG. 2, the structure of the touch sensor 5 will be described in detail below.

As illustrated in FIG. 2, the touch sensor 5 includes a touch region 5c and a peripheral region 5d. The plurality of linear electrodes 6x and 6y extend in the touch region 5c, The peripheral region 5d surrounds the touch region 5c, The touch region 5c is a region in which the sensor controller 4 can detect the positions of the active pen P and the finger F. The touch region 5c is larger in size than the display region 3a illustrated in FIG. 1 to ensure that the position of the pointer is detected with high accuracy even at edges of the display region 3a. In the peripheral region 5d, a plurality of routing lines L1, L2L, and L2R extend. The plurality of routing lines L1 respectively connect the plurality of linear electrodes 6x to corresponding ones of the plurality of FPC connection terminals T, while the plurality of routing lines L2L and L2R respectively connect the plurality of linear electrodes 6y to corresponding ones of the plurality of FPC connection terminals T.

Each of the plurality of routing lines L1 is a routing trace provided for a corresponding one of the plurality of linear electrodes 6x and a corresponding one of the plurality of FPC connection terminals T. Specifically, one end of each of the plurality of routing lines L1 is connected to one end (an end portion on the lower side of FIG. 2) of a corresponding one of the plurality of linear electrodes 6x, while the other end of each of the plurality of routing lines L1 is connected to one end of a corresponding one of the plurality of FPC connection terminals T. Each of the plurality of routing lines L2L is a routing trace provided for a corresponding one of the plurality of linear electrodes 6y and a corresponding one of the plurality of FPC connection terminals T. Specifically, one end of each of the plurality of routing lines L2L is connected to one end (an end portion on the left side of FIG. 2) of a corresponding one of the plurality of linear electrodes 6y, while the other end of each of the plurality of routing lines L2L is connected to one end of a corresponding one of the plurality of FPC connection terminals T. Each of the plurality of routing lines L2R is a routing trace provided for a corresponding one of the plurality of linear electrodes 6y and a corresponding one of the plurality of FPC connection terminals T. Specifically, one end of each of the plurality of routing lines L2R is connected to the other end (an end portion on the right side of FIG. 2) of a corresponding one of the plurality of linear electrodes 6y, while the other end of each of the plurality of routing lines L2R is connected to one end of a corresponding of the plurality of FPC connection terminals T.

In FIG. 2, among the plurality of FPC connection terminals T, the FPC connection terminals T connected to the routing lines L1 are denoted as FPC connection terminals T1, the FPC connection terminals T connected to the routing lines L2L are denoted as FPC connection terminals T2L, and the FPC connection terminals T connected to the routing lines L2R are denoted as FPC connection terminals T2R. The plurality of FPC connection terminals T1 are positioned as a group at equal intervals in the substantially middle of the edge 5b illustrated in FIG. 1. The plurality of FPC connection terminals T2L are positioned as a group at equal intervals on one end side of the edge 5b, spaced apart from the FPC connection terminals T1 by a separation distance D in the x direction. The plurality of FPC connection terminals T2R are positioned as a group at equal intervals on the other end side of the edge 5b, spaced apart from the FPC connection terminals T1 by the separation distance D in the x direction. The separation distance D is set to a value greater than a width R of a reachable range of the downlink signal DS on the touch sensor 5. This setting prevents the downlink signal DS from reaching both the FPC connection terminals T1 and the FPC connection terminals T2L or T2R at the same time.

The plurality of FPC connection terminals T also include a plurality of FPC connection terminals TG in addition to the plurality of FPC connection terminals T1, T2L, and T2R. Each of the plurality of FPC connection terminals TG is connected to a corresponding one of a plurality of ground traces LG. The plurality of ground traces LG are routing traces extending in pairs so as to sandwich a corresponding one of the groups of the plurality of routing lines L1, L2L, and L2R. A ground potential is supplied from the sensor controller 4 to each ground trace LG via the corresponding one of the plurality of FPC connection terminals TG. The ground traces LG, therefore, prevent external noise from reaching the plurality of routing lines L1, L2L, and L2R.

As illustrated in FIG. 2, the plurality of routing lines L1 extend side by side at equal intervals. Likewise, the plurality of routing lines L2L extend side by side at equal intervals. The plurality of routing lines L2R also extend side by side at equal intervals. In the vicinity of the touch region 5c, more routing lines are connected to the respective sensor electrodes 6 in a region more distant from the installation regions of the FPC connection terminals T. As the number of routing lines connected to the respective sensor electrodes 6 increases, the number of routing lines extending side by side decreases accordingly. Even so, in order to maintain a constant distance between the routing line L1 closest to the touch region 5c and the touch region 5c, each of the plurality of routing lines L1, L2L, and L2R extends stepwise as illustrated in FIG. 2. However, the plurality of routing lines L1, L2L, and L2R do not necessarily extend stepwise and may extend linearly until they reach the vicinity of the respective sensor electrodes 6 to be connected.

A three-dimensional structure of the touch sensor 5 will be described. The touch sensor 5 has a two-layer structure. Each component of the touch sensor 5 is formed in either an upper layer or a lower layer thereof. Specifically, in FIG. 2, the plurality of linear electrodes 6x and the plurality of FPC connection terminals T1, which are denoted by dot-hatched lines, are formed in the upper layer. The plurality of routing lines L1, which are not denoted by hatched lines but are connected to these components, are also formed in the upper layer. The plurality of linear electrodes 6y, the plurality of FPC connection terminals T2L, and the plurality of FPC connection terminals T2R, which are denoted by hatched lines upwardly slanting to the right, are formed in the lower layer. The plurality of routing lines L2L and L2R, which are not denoted by hatched lines but are connected to these components, are also formed in the lower layer. The plurality of FPC connection terminals TG, which are denoted by cross-hatched lines, are formed in both the upper and lower layers. The plurality of ground traces LGs, which are not denoted by hatched lines but are connected to these components, are also formed in both the upper and lower layers.

Referring back to FIG. 1, the sensor controller 4 is a microcontroller including a processor and a memory (neither is illustrated). The processor of the sensor controller 4 reads and executes programs stored in the memory to detect the position of the pointer on the touch surface 5a and receive a data signal transmitted from the active pen P. The memory of the sensor controller 4 stores data necessary for the processor to execute the programs and various data generated by the processor as a result of the execution of the programs. For example, the memory of the sensor controller 4 stores instructions that, when executed by the processor, cause the sensor controller 4 to perform the processes described herein. The sensor controller 4 detects the position of the active pen P using an active capacitive coupling method and detects the position of the finger F using a capacitive method.

The sensor controller 4 reports, to the host controller 2, the coordinates indicating the position of the detected pointer and various data included in the data signal received from the active pen P. The sensor controller 4 acquires pen-down information or pen-up information based on the pen pressure data received from the active pen P and reports the information to the host controller 2 at a corresponding timing. The pen-down information indicates that the active pen P has touched the touch surface 5a. The pen-up information indicates that the active pen P has been away from the touch surface 5a.

Figure 3:
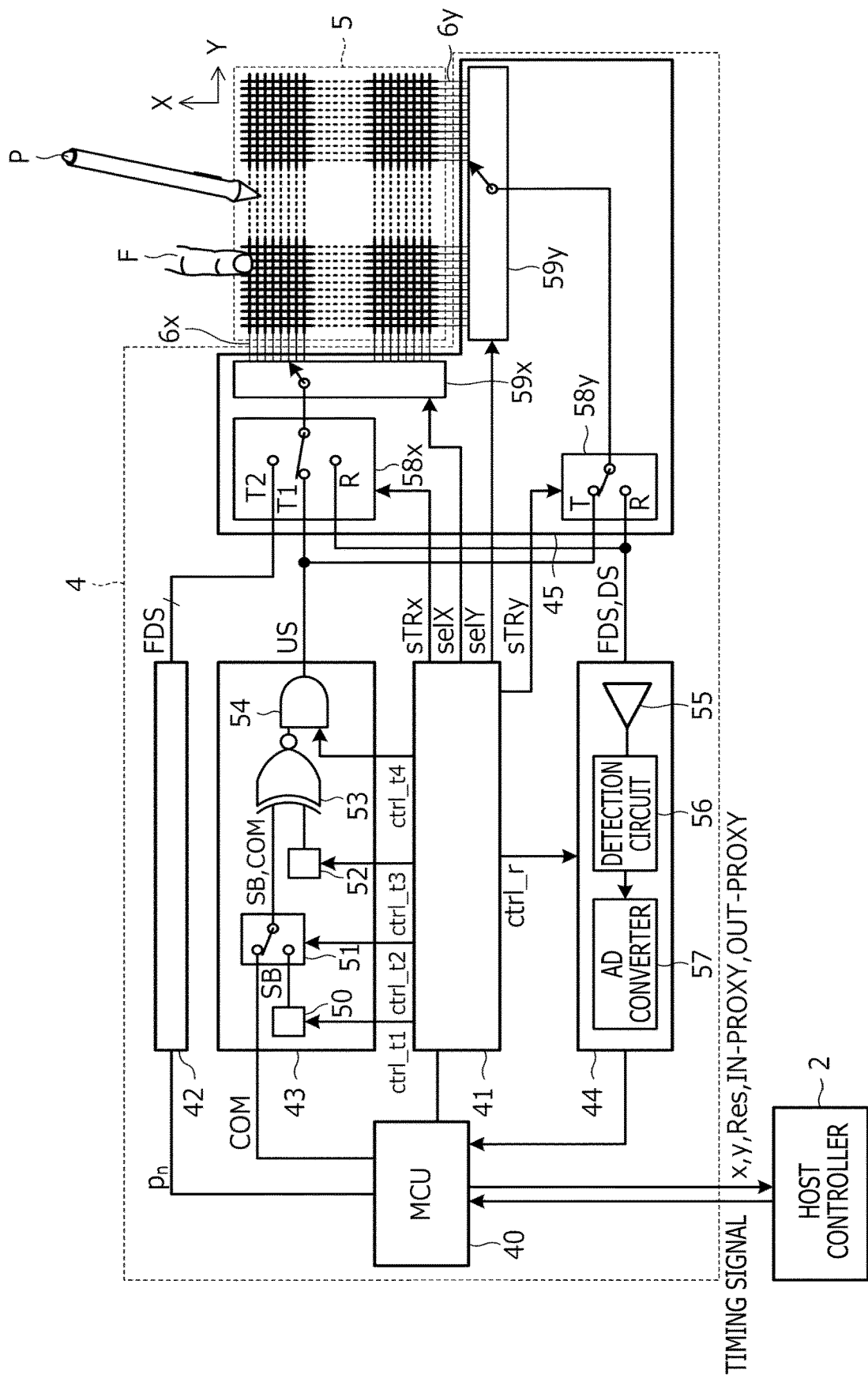
FIG. 3 is a diagram illustrating an internal configuration of a sensor controller illustrated in FIG. 1.

FIG. 3 is a diagram illustrating an internal configuration of the sensor controller 4. As illustrated in FIG. 3, the sensor controller 4 includes an MCU 40, a logic circuit 41, transmission circuits 42 and 43, a reception circuit 44, and a selection circuit 45.

The MCU 40 and the logic circuit 41 are control circuits that control transmission and reception operations of the sensor controller 4 by controlling the transmission circuits 42 and 43, the reception circuit 44, and the selection circuit 45. Specifically, the MCU 40 is a microprocessor that includes an internal memory (including a read-only memory (ROM) and a random-access memory (RAM)) and performs various operations by executing programs stored in the internal memory. The operation timing of the MCU 40 is controlled according to a timing signal supplied from the host controller 2. Examples of the operations performed by the MCU 40 include a control operation of the logic circuit 41, an operation of controlling the transmission circuit 42 so as to output a finger detection signal FDS, an operation of supplying a command COM, which indicates contents of an instruction issued to the active pen P, to the transmission circuit 43, an operation of detecting the position of each of the active pen P and the finger F (specifically, x- and y-coordinates indicating a position on the touch surface 5a) based on a digital signal supplied from the reception circuit 44, an operation of decoding the digital signal supplied from the reception circuit 44 to acquire data Res (e.g., the pen pressure data, switch data, or unique ID described above) transmitted from the active pen P, and an operation of determining whether or not the active pen P is in contact with the touch surface 5a based on the pen pressure data included in the data Res. The logic circuit 41 has a function of outputting control signals ctrl_t1 to ctrl_t4, and ctrl_r, under the control of the MCU 40.

The transmission circuit 42 is a circuit that generates the finger detection signal FDS under the control of the MCU 40 and supplies the finger detection signal FDS to each linear electrode 6x via the selection circuit 45. Specific contents of the finger detection signal FDS and a method for supplying the finger detection signal FDS to each linear electrode 6x will be described with reference to FIG. 4.

Figure 4:
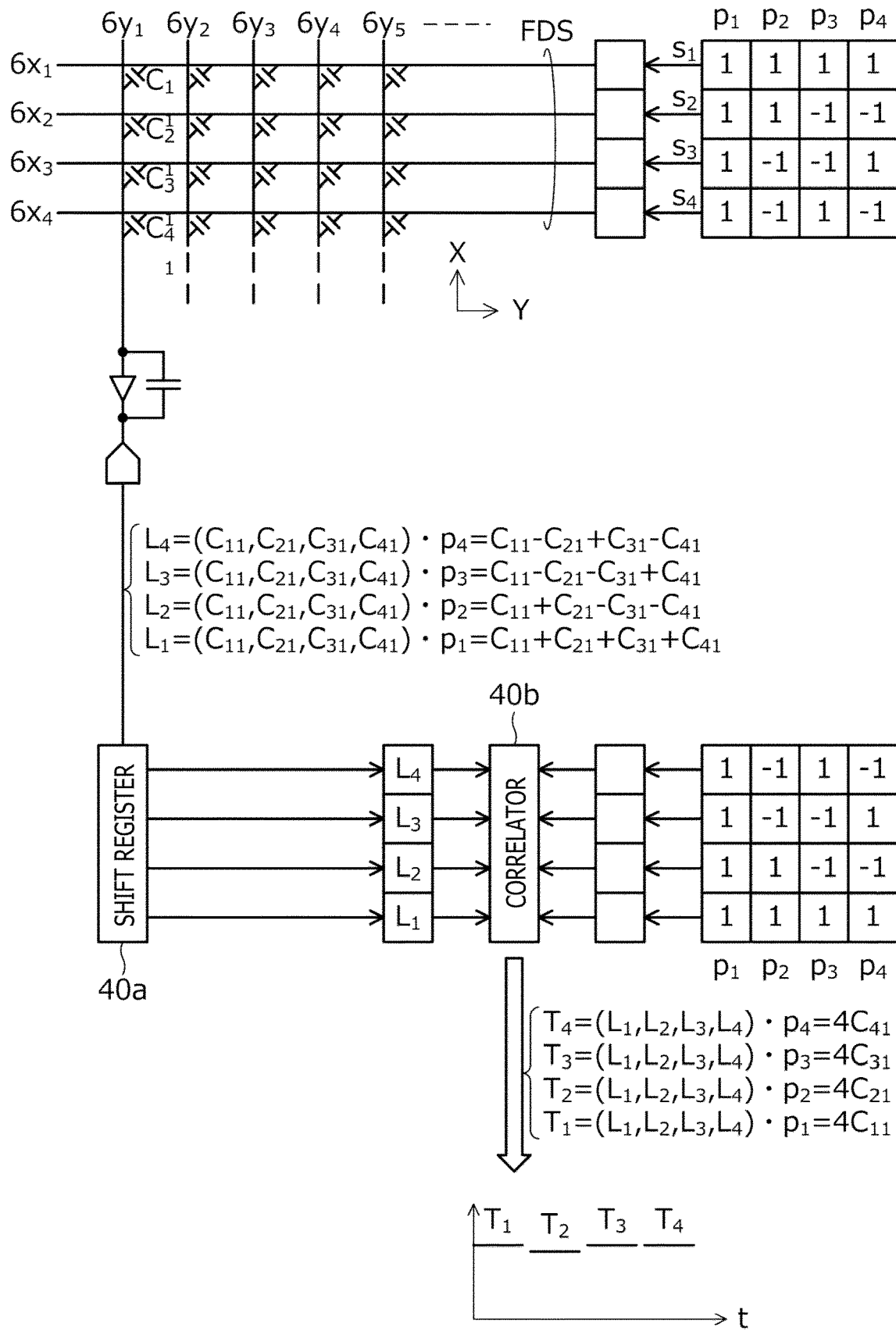
FIG. 4 is a diagram illustrating a principle of a finger position detection process performed by a micro control unit (MCU) illustrated in FIG. 3.

FIG. 4 is a diagram illustrating a principle of a finger F position detection process performed by the MCU 40. While four linear electrodes 6x are illustrated in FIG. 4 to simplify illustration, a greater number of linear electrodes 6x are disposed in actual implementation. In the following description, the number of linear electrodes 6x disposed is assumed to be K.

As illustrated in FIG. 4, the finger detection signal FDS includes K signals $s_1$ to $s_k$. Each of the K signals $s_1$ to $s_k$ includes K pulses each expressed as, for example, "1" or "−1." The n-th pulses (n=1 to K) of the respective signals $s_1$ to $s_k$ constitute a pulse group $p_n$. The pulses constituting one pulse group $p_n$ are each input from the transmission circuit 42 illustrated in FIG. 3 into a corresponding one of the linear electrodes 6x in parallel via the selection circuit 45.

Referring back to FIG. 3, the transmission circuit 43 is a circuit that generates the uplink signal US under the control of the MCU 40 and the logic circuit 41 and supplies the uplink signal US to the selection circuit 45. As illustrated in FIG. 3, the transmission circuit 43 includes a pattern supply circuit 50, a switch 51, a code string retention circuit 52, a diffusion processing circuit 53, and a transmission guard circuit 54. Although the pattern supply circuit 50 is included in the transmission circuit 43 in the present embodiment, the pattern supply circuit 50 may be included in the MCU 40.

The pattern supply circuit 50 retains a start bit SB, which is placed at the head of the uplink signal US, and outputs the retained start bit SB in accordance with an instruction of the control signal ctrl_t1 supplied from the logic circuit 41.

The switch 51 has a function of selecting either the pattern supply circuit 50 or the MCU 40 based on the control signal ctrl_t2 supplied from the logic circuit 41 and supplying an output of the selected one to the diffusion processing circuit 53. When the switch 51 selects the pattern supply circuit 50, the start bit SB is supplied to the diffusion processing circuit 53. When the switch 51 selects the MCU 40, the command COM is supplied to the diffusion processing circuit 53.

The code string retention circuit 52 has a function of generating and retaining a diffusion code with a predetermined chip length, which has autocorrelation characteristics, based on the control signal ctrl_t3 supplied from the logic circuit 41. The diffusion code retained by the code string retention circuit 52 is supplied to the diffusion processing circuit 53.

The diffusion processing circuit 53 has a function of acquiring a transmission chip string having a predetermined chip length by modulating the diffusion code, which has been retained by the code string retention circuit 52, based on the value (start bit SB or command COM) supplied via the switch 51. The diffusion processing circuit 53 supplies the acquired transmission chip string to the selection circuit 45 via the transmission guard circuit 54.

The transmission guard circuit 54 has a function of inserting a guard period (a period in which neither transmission nor reception is performed) between a transmission period of the uplink signal US and a reception period of the downlink signal DS based on the control signal ctrl_t4 supplied from the logic circuit 41. The guard period is necessary to switch between the transmission operation and the reception operation.

The selection circuit 45 includes switches 58x and 58y and conductor selection circuits 59x and 59y.

The switch 58y is a switch element that connects a common terminal to either a T terminal or an R terminal. The common terminal of the switch 58y is connected to the conductor selection circuit 59y. The T terminal is connected to an output end of the transmission circuit 43. The R terminal is connected to an input end of the reception circuit 44. The switch 58x is a switch element that connects a common terminal to any one of a T1 terminal, a T2 terminal, and an R terminal. In actual implementation, the T2 terminal includes the same number of terminals as the number of linear electrodes 6x. The common terminal of the switch 58x is connected to the conductor selection circuit 59x. The T1 terminal is connected to the output end of the transmission circuit 43. The T2 terminal is connected to an output end of the transmission circuit 42. The R terminal is connected to the input end of the reception circuit 44.

The conductor selection circuit 59x is a switch element that selectively connects the plurality of linear electrodes 6x to the common terminal of the switch 58x. The conductor selection circuit 59x can simultaneously connect part or all of the plurality of linear electrodes 6x to the common terminal of the switch 58x. When the common terminal is connected to the T2 terminal in the switch 58x, the conductor selection circuit 59x respectively connects the plurality of terminals included in the T2 terminal to corresponding ones of the plurality of linear electrodes 6x.

The conductor selection circuit 59y is a switch element that selectively connects the plurality of linear electrodes 6y to the common terminal of the switch 58y. The conductor selection circuit 59y can simultaneously connect part or all of the plurality of linear electrodes 6y to the common terminal of the switch 58y.

Four control signals sTRx, sTRy, selX, and selY are supplied from the logic circuit 41 to the selection circuit 45. Specifically, the control signal sTRx is supplied to the switch 58x. The control signal sTRy is supplied to the switch 58y. The control signal selX is supplied to the conductor selection circuit 59x. The control signal selY is supplied to the conductor selection circuit 59y. The logic circuit 41 controls the selection circuit 45 using these control signals sTRx, sTRy, selX, and selY to transmit the uplink signal US or the finger detection signal FDS and receive the downlink signal DS or the finger detection signal FDS.

Specifically, upon transmission of the uplink signal US, the logic circuit 41 controls the selection circuit 45 so as to simultaneously connect all of the plurality of linear electrodes 6y to the transmission circuit 43. Since the uplink signal US is simultaneously transmitted from all of the plurality of linear electrodes 6y, the active pen P can receive the uplink signal US wherever the active pen P is on the touch surface 5a.

Upon reception of the above-described position signal included in the downlink signal DS, the logic circuit 41 performs control for global scan when the MCU 40 has not detected the active pen P, whereas the logic circuit 41 performs control for local scan when the MCU 40 has already detected the active pen P.

The global scan is a process of detecting a pen position on the entire touch surface 5a. In the global scan, the logic circuit 41 selects all the sensor electrodes 6 one by one and controls the selection circuit 45 so as to connect the selected sensor electrode 6 to the reception circuit 44. Accordingly, the same number of position signals as the number of sensor electrodes 6 are sequentially supplied to the reception circuit 44.

The local scan is a process of detecting a pen position only in the vicinity of the previous pen position. In the local scan, the MCU 40 selects a predetermined number (e.g., four or eight) of linear electrodes 6x and a predetermined number (e.g., four or eight) of linear electrodes 6y in the vicinity of the previously detected pen position. The logic circuit 41 selects the predetermined number of linear electrodes 6x and 6y, which have been selected in this manner, one by one at a time interval corresponding to the number of selected linear electrodes 6x and 6y and controls the selection circuit 45 so as to connect the selected linear electrodes 6x and 6y to the reception circuit 44. Accordingly, the same number of position signals as the total number of selected linear electrodes 6x and 6y are sequentially supplied to the reception circuit 44.

The MCU 40 detects a pen position based on the levels of the position signals supplied to the reception circuit 44 in this manner. Specifically, the MCU 40 determines the level of the position signal at each of intersections of the linear electrodes 6x and 6y based on a digital signal (described later) supplied from the reception circuit 44. Then, the MCU 40 detects a pen position based on each determined level. Specifically, the MCU 40 may determine a region of the touch surface 5a, in which the levels of the position signals are equal to or higher than a predetermined value, and detect, for example, a center position of the region as the pen position.

If the levels of the position signals received from all of the plurality of linear electrodes 6x are equal to or lower than the predetermined value, or the levels of the position signals received from all of the plurality of linear electrodes 6y are equal to or lower than the predetermined value, the MCU 40 does not detect any pen position. This configuration can, to some extent, prevent a pen position from being detected in the touch region 5c when the pen tip of the active pen P is actually in the peripheral region 5d. However, if the position signal is simultaneously detected in both the routing line L1 connected to the linear electrode 6x and the routing line L2L or L2R connected to the linear electrode 6y, a pen position is falsely detected anyway. According to an embodiment of the present disclosure, it is possible to prevent such false pen position detection in a more reliable manner. The details will be described later.

Upon reception of the above-described data signal included in the downlink signal DS, the MCU 40 selects, among the plurality of sensor electrodes 6, one sensor electrode 6 closest to a pen position detected based on the position signals received immediately before. The logic circuit 41 then controls the selection circuit 45 so as to connect the selected sensor electrode 6 to the reception circuit 44. Accordingly, the data signal transmitted from the active pen P is supplied to the reception circuit 44.

Upon transmission of the finger detection signal FDS, the logic circuit 41, in cooperation with the MCU 40, selects one linear electrode 6y and causes the transmission circuit 42 to sequentially input the above-described pulse groups $p_1$ to $p_k$ to the respective linear electrodes 6x. The logic circuit 41 repeats this operation for each linear electrode 6y. Specifically, the logic circuit 41 controls the selection circuit 45 so as to connect each of the plurality of terminals constituting the T2 terminal of the switch 58x to the corresponding one of the plurality of linear electrodes 6x. While maintaining this state, the logic circuit 41 selects the plurality of linear electrodes 6y one by one and controls the selection circuit 45 so as to connect the selected linear electrode 6y to the reception circuit 44.

While one linear electrode 6y is selected, the MCU 40 reads the pulse groups $p_1$ to $p_k$ from the memory one by one. Each time the MCU 40 reads one pulse group, the MCU 40 supplies K pulses constituting the read pulse group to the transmission circuit 42. The transmission circuit 42 inputs the K pulses supplied in this manner to the respective K linear electrodes 6x in parallel. The level of a digital signal supplied from the reception circuit 44 as a result of this control reflects a change in capacitance formed at each of intersections between the selected linear electrode 6y and the linear electrodes 6x. The MCU 40 detects the position of the finger F based on the level of the digital signal supplied from the reception circuit 44.

Referring back to FIG. 4, the finger F position detection process performed by the MCU 40 will be described in more detail below. Although the number of linear electrodes 6x is assumed to be four (i.e., K=4) in the following description, the same description applies to cases where the number of linear electrodes 6x is three or less or five or greater.

When the number of the linear electrodes 6x is four, each of the signals $s_1$ to $s_k$ is constituted by four pulses expressed by "1" or "−1." Specifically, as illustrated in FIG. 4, the signal $s_1$ is constituted by "1, 1, 1, 1," the signal $s_2$ is constituted by "1, 1, −1, −1," the signal $s_3$ is constituted by "1, −1, −1, 1," and the signal $s_4$ is constituted by "1, −1, 1, −1."

The MCU 40 functionally includes a shift register 40a and a correlator 40b. The shift register 40a is a first in first out (FIFO)-type storage device, and can store the same number (i.e., K) of data as the number of the linear electrodes 6x. When new data is stored in the shift register 40a, data stored K times before is deleted therefrom. As described above, the MCU 40 and the logic circuit 41 select one linear electrode 6y and cause the transmission circuit 42 to sequentially input the pulse groups $p_1$ to $p_4$ to the respective linear electrodes 6x. The MCU 40 and the logic circuit 41 repeat this operation for each linear electrode 6y. As a result, four levels $L_1$ to $L_4$ corresponding to the respective pulse groups $p_1$ to $p_4$ sequentially appear in the selected linear electrode 6y. The MCU 40 sequentially acquires the levels $L_1$ to $L_4$ appearing in the linear electrode 6y in this manner via the reception circuit 44 and stores the acquired levels in the shift register 40a each time the MCU 40 acquires the levels.

The details of the levels $L_1$ to $L_4$ will be described below, assuming that a linear electrode $6y_1$ illustrated in FIG. 4 is selected. In the following description, capacitances formed between the linear electrode $6y_1$ and four linear electrodes $6x_1$ to $6x_4$ will be denoted as $C_{11}$ to $C_{41}$, respectively.

The level $L_1$ corresponding to the pulse group $p_1$ and stored in the shift register 40a is an inner product of a capacitance vector ($C_{11}$, $C_{21}$, $C_{31}$, $C_{41}$) and a vector (1, 1, 1, 1) indicating the pulse group $p_1$. This inner product is calculated as $C_{11}+C_{21}+C_{31}+C_{41}$ as denoted in FIG. 4. Similarly, the level L2 corresponding to the pulse group $p_2$ and stored in the shift register 40a is an inner product of the capacitance vector ($C_{11}$, $C_{21}$, $C_{31}$, $C_{41}$) and a vector (1, 1, −1, −1) indicating the pulse group $p_2$, and this inner product is calculated as $C_{11}+C_{21}-C_{31}-C_{41}$. The level $L_3$ corresponding to the pulse group $p_3$ and stored in the shift register 40a is an inner product of the capacitance vector ($C_{11}$, $C_{21}$, $C_{31}$, $C_{41}$) and a vector (1, −1, −1, 1) indicating the pulse group $p_3$, and this inner product is calculated as $C_{11}-C_{21}-C_{31}+C41$. The level $L_4$ corresponding to the pulse group $p_4$ and stored in the shift register 40a is an inner product of the capacitance vector ($C_{11}$, $C_{21}$, $C_{31}$, $C_{41}$) and a vector (1, −1, 1, −1) indicating the pulse group $p_4$, and this inner product is calculated as $C_{11}-C_{21}+C_{31}-C_{41}$.

Using the correlator 40b, the MCU 40 sequentially calculates correlation values $T_1$ to $T_4$ correlating with the levels $L_1$ to $L_4$ accumulated in the shift register 40a for the respective four pulse groups $p_1$ to $p_4$. As illustrated in FIG. 4, contents of the correlation values $T_1$ to $T_4$ calculated in this manner are $4C_{11}$, $4C_{21}$, $4C_{31}$, and $4C_{41}$, respectively. That is, the correlation values $T_1$ to $T_4$ reflect respective changes in capacitances formed at the intersections of the linear electrodes $6x_1$ to $6x_4$ and the linear electrode $6y_1$. Therefore, the MCU 40 can detect the position of the finger F by referring to the correlation values $T_1$ to $T_4$ calculated for each linear electrode 6y. Specifically, the MCU 40 may determine a region of the touch surface 5a, in which changes in capacitances are equal to or greater than a predetermined value, and detect, for example, a center position of the region as the position of the finger F.

The finger F position detection process performed by the MCU 40 has been described in detail above. Referring back to FIG. 3, the reception circuit 44 is a circuit that receives, in response to the control signal ctrl_r of the logic circuit 41, the downlink signal DS transmitted from the active pen P or the finger detection signal FDS transmitted from the transmission circuit 42. Specifically, the reception circuit 44 includes an amplification circuit 55, a detection circuit 56, and an analog-digital (AD) converter 57.

The amplification circuit 55 is a circuit that amplifies and outputs the downlink signal DS or the finger detection signal FDS supplied from the selection circuit 45. The detection circuit 56 is a circuit that generates a voltage corresponding to the level of an output signal received from the amplification circuit 55. The AD converter 57 is a circuit that generates a digital signal by sampling the voltage output from the detection circuit 56 at predetermined time intervals. The digital signal output from the AD converter 57 is supplied to the MCU 40.

Based on the digital signal supplied in this manner, the MCU 40 detects the position (x- and y-coordinates) of the finger F or the active pen P and acquires data Res transmitted from the active pen P. Specifically, upon detection of a touch position, the MCU 40 acquires the levels $L_1$ to $L_k$ corresponding to the pulse groups $p_1$ to $p_k$ for each of the linear electrodes 6y based on the supplied digital signal. The MCU 40 then detects a touch position from the levels $L_1$ to $L_k$ using the method described above with reference to FIG. 4. Upon detection of a pen position, as described above, the MCU 40 determines the levels of position signals at respective intersections of the plurality of sensor electrodes 6 based on the supplied digital signal and detects a pen position based on the determined levels. Upon acquisition of the data Res, the MCU 40 acquires the data Res by decoding the digital signal supplied from the reception circuit 44. The MCU 40 outputs the position (x- and y-coordinates) detected in this manner and the data Res to the host controller 2.

Further, the MCU 40 determines whether the active pen P has contacted or has been away from the touch surface 5a based on the pen pressure data included in the acquired data Res. When the MCU 40 determines that the active pen P has newly contacted the touch surface 5a (i.e., pen pressure has changed from 0 to a positive value), the MCU 40 outputs pen-down information IN-PROXY to the host controller 2. When the MCU 40 determines that the active pen P has been away from the touch surface 5a (i.e., pen pressure has changed from a positive value to 0), the MCU 40 outputs pen-up information OUT-PROXY to the host controller 2. The host controller 2 uses the pen-down information IN-PROXY and the pen-up information OUT-PROXY output in this manner to recognize the start and end of a stroke.

Referring back to FIG. 1, the host controller 2 performs at least one of display of a cursor and generation of ink data in response to receiving the coordinates from the sensor controller 4. To display the cursor, the host controller 2 displays a predetermined cursor image at a position corresponding to the received coordinates on the display region 3a of the display device 3.

Ink data refers to data including control points and curve data. The control points represent the respective coordinates sequentially supplied from the sensor controller 4. The curve data is obtained by interpolating the control points with a predetermined interpolation curve. The host controller 2 starts generation of ink data for the finger F when the input of the coordinates starts and ends the generation of the ink data when the input of the coordinates ends. The host controller 2 starts generation of ink data for the active pen P when the pen-down information is input and ends the generation of the ink data when the pen-up information is input. When the host controller 2 generates ink data for the active pen P, the host controller 2 also controls the width and/or transparency of the curve data included in the ink data based on, for example, the pen pressure data received from the active pen P. The host controller 2 performs rendering of the generated ink data and displays the resulting image on the display device 3, and at the same time stores the generated ink data in the memory of the host controller 2.

Of the processes performed by the MCU 40 of the sensor controller 4, processes relevant to the characteristics of an embodiment of the present disclosure will be described in detail below.

Figure 5:
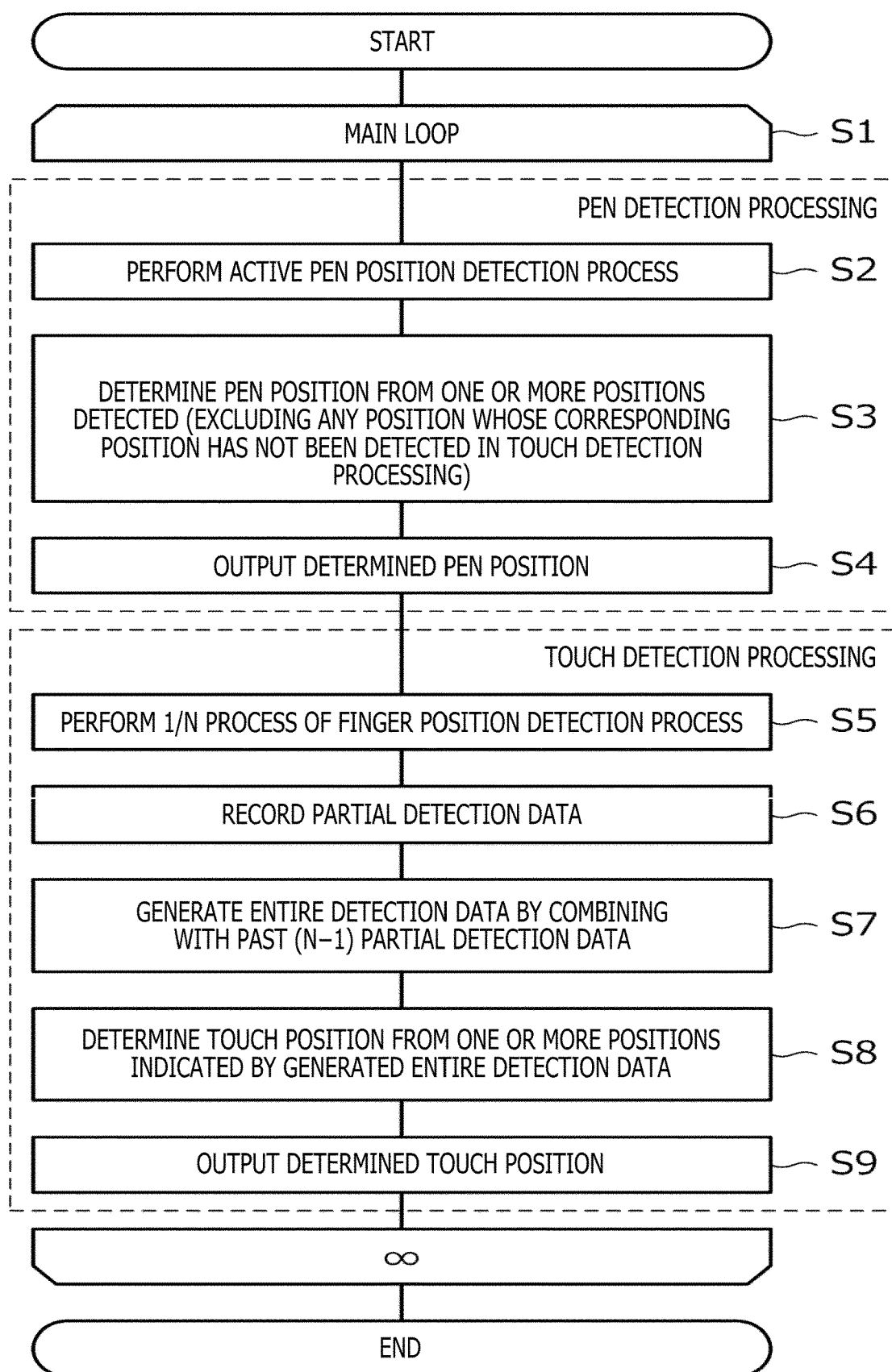
FIG. 5 is a flowchart illustrating an outline of a pointer position detection process performed by the MCU illustrated in FIG. 3.

FIG. 5 is a flowchart illustrating an outline of a pointer position detection process performed by the MCU 40. As illustrated in FIG. 5, the MCU 40 repeatedly performs processes at S2 to S9 (S1). At S2 to S4, the MCU 40 performs a pen detection for detecting the position of the active pen P (pen position). At S5 to S9, the MCU 40 performs a touch detection for detecting the position of the finger F (touch position).

The processes at S2 to S9 are now described in detail. The sensor controller 4 performs an active pen P position detection process to detect one or more candidates for a pen position (hereinafter referred to as "candidate pen positions") (S2: a candidate pen position detection process). The details of this position detection process are as described with reference to FIG. 3.

Next, the sensor controller 4 performs a process of determining a pen position from one or more candidate pen positions detected (S3: a pen position determination process), and outputs only the determined pen position (hereinafter referred to as a "definitive pen position") to the host controller 2 (S4: an output process). Hereinafter, the process performed in S3 will be referred to as a "pen position determination process."

In the pen position determination process, as denoted in parentheses of FIG. 5, any candidate pen position whose corresponding candidate touch position (described later) has not been detected in the touch detection is excluded from output targets. Because of this exclusion, a pointer position detection method according to the present embodiment can prevent a pen position from being detected in the touch region 5c when the pen tip of the active pen P is actually in the peripheral region 5d. Moreover, any candidate pen position that is considered to be a contact position of a hand of the user holding the active pen P (hereinafter referred to as a "palm") is also excluded from the output targets in the pen position determination process. The details of the pen position determination process will be described in detail later.

Next, the sensor controller 4 performs a 1/N process of the finger F position detection process (S5). The details of the finger F position detection process are as described with reference to FIG. 4. The 1/N process refers to one round of the finger F position detection process when the finger F position detection process is performed N times to secure a detection rate of the active pen P. For example, the 1/N process refers to the finger F position detection process targeting only 1/N of the total number of linear electrodes 6x. The sensor controller 4 records data indicating a partial detection result obtained in the 1/N process (hereinafter referred to as "partial detection data") in the memory of the sensor controller 4 (S6). Then, each time the sensor controller 4 performs the 1/N process, the sensor controller 4 combines partial detection data recorded this time with N−1 partial detection data recorded in the past, thereby generating data indicating the position of the finger F (hereinafter referred to as "entire detection data"), and detects one or more candidates for a touch position (hereinafter referred to as "candidate touch positions") based on the generated entire detection data (S7: a candidate touch position detection process).

The sensor controller 4 then performs a process of determining a touch position from one or more candidate touch positions detected in S7 (S8), and outputs only the determined touch position (hereinafter referred to as a "definitive touch position") to the host controller 2 (S9). Hereinafter, the process performed in S8 will be referred to as a "touch position determination process."

In the touch position determination process, any candidate touch position that is considered to be a contact position of the active pen P or the palm is excluded from output targets. The details of the touch position determination process will be described in detail later.

Although only one active pen P is assumed to be present on the touch surface 5a in the present embodiment, two or more active pens P may be present on the touch surface 5a in another embodiment. In this case, the sensor controller 4 may separately receive the downlink signal DS from each active pen P using multiplexing such as time division, frequency division, or code division and perform S3 and S4 for each active pen P.

FIG. 6A illustrates a candidate pen position table for storing the candidate pen positions. FIG. 6B illustrates a touch position table for storing the candidate touch positions. The MCU 40 uses these tables to perform the pen position determination process and the touch position determination process described above.

As illustrated in FIG. 6A, the candidate pen position table stores a candidate pen position cP[i], a definitive pen position fP[i], and a valid flag in association with each other. As illustrated in FIG. 6B, the touch position table stores a candidate touch position cT[j], a definitive touch position fT[j], a valid flag, and a region type in association with each other. Note that i and j are integers of 0 or greater.

Figure 7:
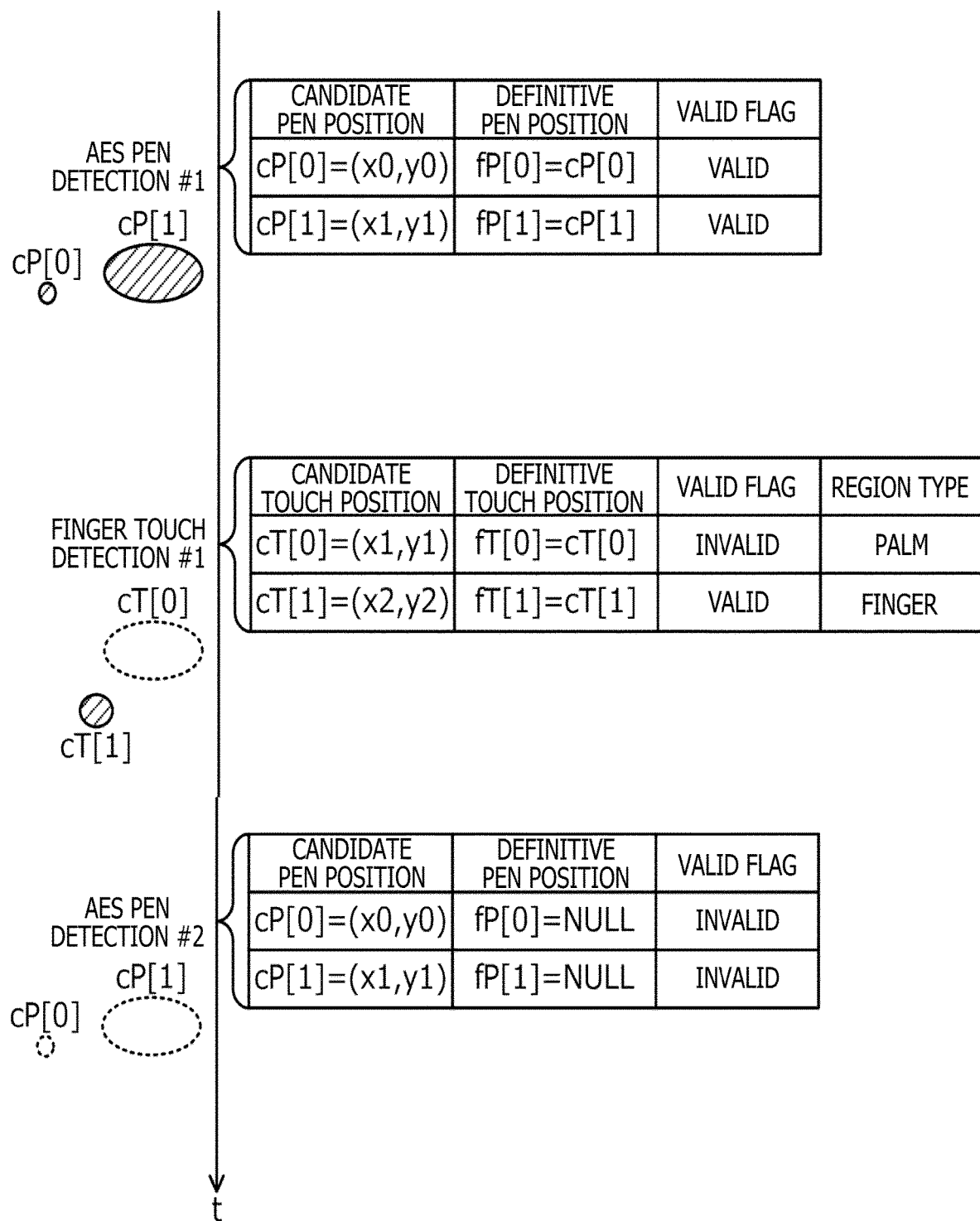
FIG. 7 is a diagram illustrating an example of a pen position determination process and a touch position determination process (when a pen tip of an active pen is in a peripheral region)
Figure 8:
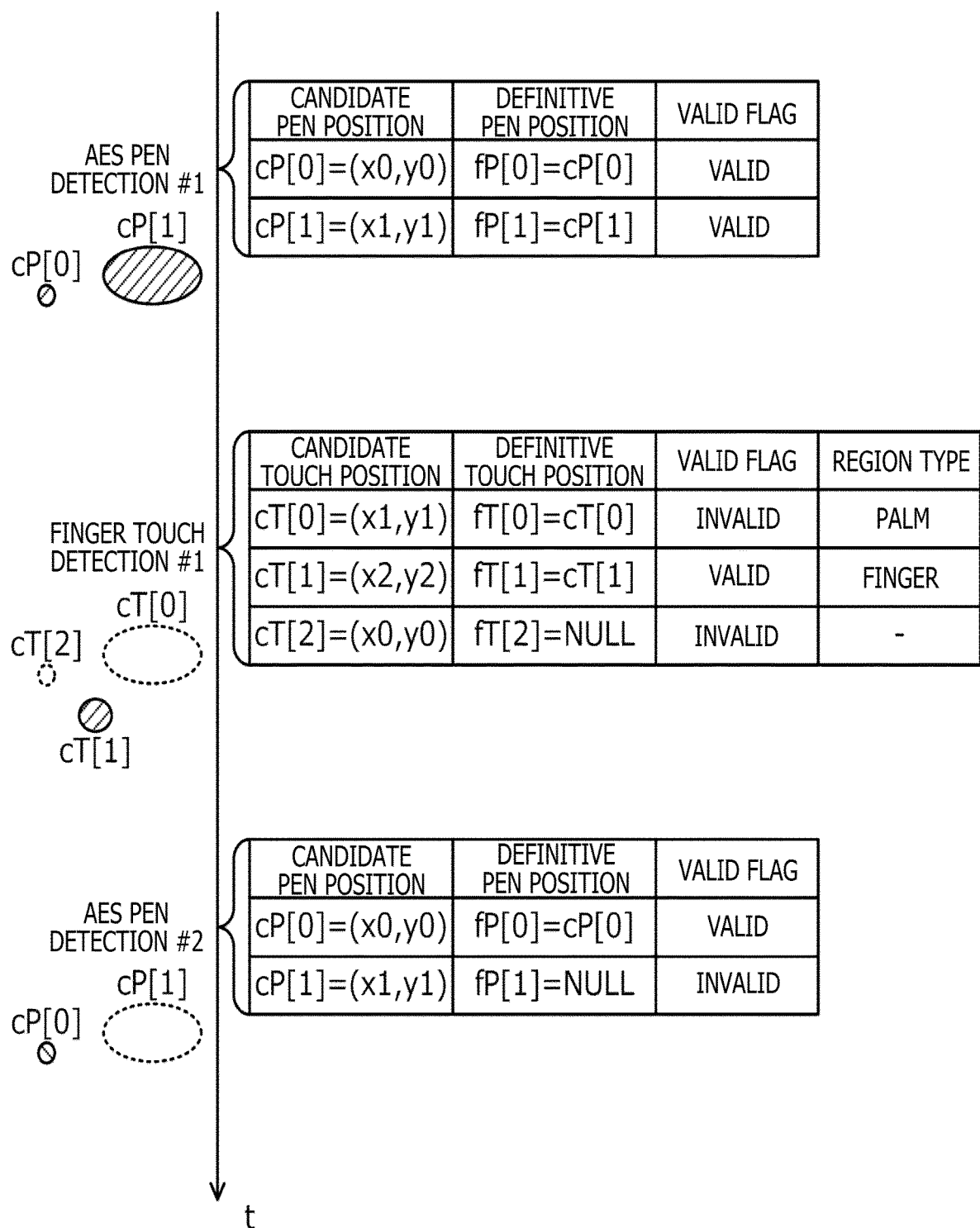
FIG. 8 is a diagram illustrating an example of the pen position determination process and the touch position determination process (when the pen tip of the active pen is in a touch region)

Each of FIGS. 7 and 8 illustrates an example of the pen position determination process and the touch position determination process. FIG. 7 illustrates a case where the pen tip of the active pen P is in the peripheral region 5d, while FIG. 8 illustrates a case where the pen tip of the active pen P is in the touch region 5c, Hereinafter, the pen position determination process and the touch position determination process will be described in detail with reference to specific examples illustrated in FIGS. 7 and 8.

In the example of FIG. 7, the MCU 40, which has performed the first round of active pen P position detection process, stores two candidate pen positions cP[0] and cP[1] in the candidate pen position table. Next, the MCU 40 sets definitive pen positions fP[0] and fP[1] to the candidate pen positions cP[0] and cP[1], respectively, and also sets their valid flags to "valid." The MCU 40 supplies the definitive pen positions fP[0] and fP[1] set to "valid" to the host controller 2 as pen positions. Alternatively, the MCU 40 may omit the supply of the pen positions to the host controller 2 since the finger F position detection process has not been performed at this point.

Next, the MCU 40 performs the first round of the finger F position detection process and stores two candidate touch positions cT[0] and cT[1] in the touch position table as a result of the finger F position detection process. Next, the MCU 40 detects the size of each of the candidate touch positions cT[0] and cT[1] (size of a region in which the amount of change in capacitance is equal to or greater than a predetermined amount). Here, assume that the candidate touch position cT[0] is detected as having a predetermined size or greater while the candidate touch position cT[1] is detected as having a size of less than the predetermined size. In this case, the MCU 40 sets the definitive touch position fT[0] to the candidate touch position cT[0], the corresponding valid flag to "invalid," and the corresponding region type to "palm."

The MCU 40 then determines whether or not the candidate touch position cT[1] detected as having a size of less than the predetermined size is substantially equal to any of the definitive pen positions fP[0] and fP[1] stored in the candidate pen position table. Here, the term "substantially equal" refers to a state in which the distance between one position and the other position is equal to or less than a predetermined value that is sufficiently smaller than the size of the touch surface 5a. Preferably, this predetermined value is equivalent to a length of several pixels, for example.

In the example of FIG. 7, the MCU 40 determines that the candidate touch position cT[1] is not equal to any of the definitive pen positions fP[0] and fP[1]. In this case, the MCU 40 sets a definitive touch position fT[1] to the candidate touch position cT[1], the corresponding valid flag to "valid," and the corresponding region type to "finger." Although different from the example of FIG. 7, if the MCU determines that the candidate touch position cT[1] is equal to, for example, one of the definitive pen positions fP[0] and fP[1], the MCU 40 leaves the definitive touch position fT[1] as it is (in this case, the definitive touch position fT[1] maintains the initial value NULL) and sets the corresponding valid flag to "invalid." With this configuration, even if a candidate touch position has been detected due to capacitive coupling between the pen electrode of the active pen P and the sensor electrode 6, the candidate touch position can be excluded from the output targets.

After setting the touch position table as described above, the MCU 40 supplies only the definitive touch position fT[1] with the corresponding valid flag set to "valid" to the host controller 2 as a touch position.

Next, the MCU 40 resets the candidate pen position table and then performs the second round of the active pen P position detection process. Here, if neither the active pen P nor the palm has moved on the touch surface 5a, the same two candidate pen positions cP[0] and cP[1] as in the first round of the active pen P position detection process are stored in the candidate pen position table as a result of the position detection.

Next, the MCU 40 determines whether or not the acquired candidate pen positions cP[0] and cP[1] are substantially equal to any of the candidate touch positions cT[0] and cT[1] stored in the touch position table. In the example of FIG. 7, the MCU 40 determines that there is a candidate touch position (i.e., the candidate touch position cT[0]) substantially equal to the candidate pen position cP[1], while there is no candidate touch position substantially equal to the candidate pen position cP[0]. In this case, the MCU 40 leaves the definitive pen position fP[0] as it is (in this case, the definitive pen position fP[0] maintains the initial value NULL) and sets the corresponding valid flag to "invalid." If the pen tip of the active pen P is located in the touch region 5c, capacitive coupling should occur between the pen electrode of the active pen P and the sensor electrode 6 and a candidate touch position should be detected. Therefore, it can be said that the candidate pen position cP[0] that does not have any corresponding candidate touch position is a candidate pen position that has been detected even though the pen tip of the active pen P is not located in the touch region 5c (that is, the pen tip of the active pen P is located in the peripheral region 5d). This process can therefore prevent a pen position from being detected in the touch region 5c when the pen tip of the active pen P is actually in the peripheral region 5d.

Further, the MCU 40 determines, among the definitive touch positions fT[0] and fT[1] stored in the touch position table, whether or not there is any definitive touch position substantially equal to the candidate pen position cP[1] determined to have a candidate touch position substantially equal to the candidate pen position cP[1] among the candidate touch positions cT[0] and cT[1] stored in the touch position table. In the example of FIG. 7, the MCU 40 determines that there is a definitive touch position (i.e., the definitive touch position fT[0]) substantially equal to the candidate pen position cP[1]. In this case, the MCU 40 determines whether the region type of the definitive touch position fT[0] is "finger" or "palm." In the example of FIG. 7, the MCU 40 determines that the region type is "palm" and therefore leaves the definitive pen position fP[1] as it is (in this case, the definitive pen position fP[1] maintains the initial value NULL) and sets the corresponding valid flag to "invalid." As a result, no pen position is supplied to the host controller 2 in the example of FIG. 7. Accordingly, the candidate pen positions that have been detected due to the downlink signal DS transmitted from a hand of the user holding the active pen P are excluded from the output targets.

Although different from the example of FIG. 7, if the MCU 40 determines that there is no definitive touch position substantially equal to the candidate pen position cP[1] among the definitive touch positions fT[0] and fT[1] stored in the touch position table or that the region type of the definitive touch position fT[0] determined to be substantially equal to the candidate pen position cP[1] is "finger," the MCU 40 sets the definitive pen position fP[1] to the candidate pen position cP[1] and the corresponding valid flag to "valid." In this case, the definitive pen position fP[1] is supplied to the host controller 2.

The example of FIG. 8 is different from the example of FIG. 7 in that a candidate touch position cT[2] is detected at a position substantially equal to the candidate pen position cP[0] in the first round of the finger F position detection process. Since the candidate touch position cT[2] is detected due to capacitive coupling between the pen electrode of the active pen P, whose pen tip is located in the touch region 5c, and the sensor electrode 6, the size of the candidate touch position cT[2] is less than the predetermined size described above. Therefore, the MCU 40 does not set the region type of the candidate touch position cT[2] to "palm." In the subsequent process, the MCU 40 determines whether or not the candidate touch position cT[2] is substantially equal to any of the definitive pen positions fP[0] and fP[1]. After the MCU 40 determines that the candidate touch position cT[2] is substantially equal to the definitive pen position fP[0], the MCU 40 sets a definitive touch position fT[2] to NULL and the corresponding valid flag to "invalid."

In this manner, the information about the candidate touch position cT[2] is set in the touch position table. Accordingly, in the determination process after the second round of the active pen P position detection process, the MCU 40 determines that there is a candidate touch position (i.e., the candidate touch position cT[2]) substantially equal to the candidate pen position cP[0] in the touch position table while determining that there is no definitive touch position substantially equal to the candidate pen position cP[0]. Therefore, the MCU 40 sets the definitive pen position fP[0] to the candidate pen position cP[0] and the corresponding valid flag to "valid." As a result, the definitive pen position fP[0] is supplied to the host controller 2.

As described above, the pointer position detection method and the sensor controller 4 according to the present embodiment do not determine a candidate pen position, whose corresponding candidate touch position has not been detected, as a pen position. This configuration can, therefore, prevent a pen position from being detected in the touch region 5c when the pen tip of the active pen P is actually in the peripheral region 5d. Moreover, the pointer position detection method according to the present embodiment can exclude the contact position of the palm from the output targets in the pen position determination process and the contact positions of the active pen P and the palm from the output targets in the touch position determination process.

Referring to the process flow of the MCU 40, the pen position determination process and the touch position determination process performed by the MCU 40 will be described again in more detail from a different perspective.

Figure 9:
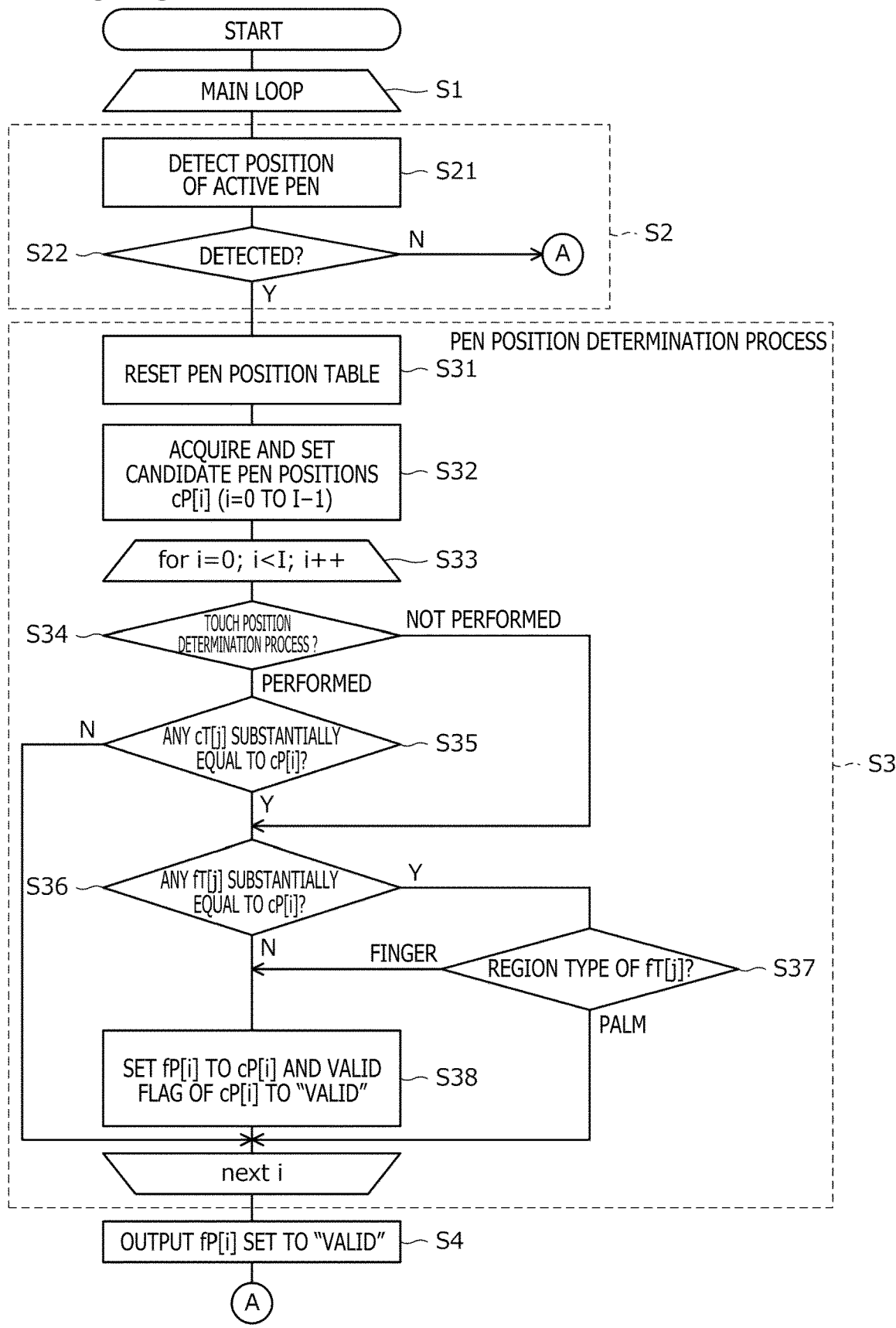
FIG. 9 is a flowchart illustrating details of the flowchart illustrated in FIG. 5.
Figure 10:
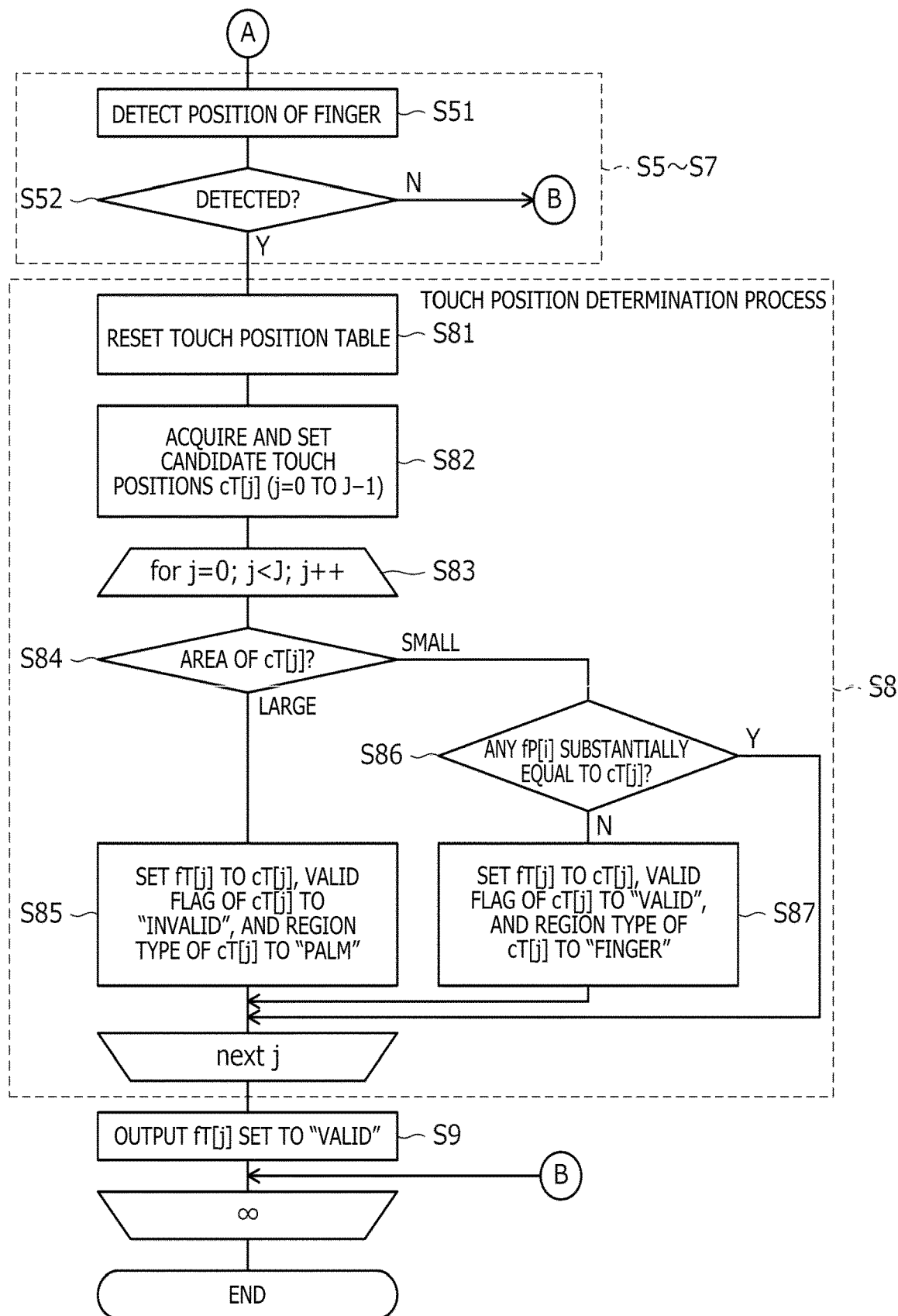
FIG. 10 is a flowchart illustrating details of the flowchart illustrated in FIG. 5.

FIGS. 9 and 10 are flowcharts each illustrating details of the flowchart illustrated in FIG. 5. Referring to FIG. 9, the MCU 40 first performs the process in S2 of FIG. 5 by performing processes at S21 and S22. Specifically, the MCU 40 performs detection of the active pen P (S21) and determines whether or not the active pen P has been detected as a result of the detection (S22). When the MCU 40 determines at S22 that the active pen P has not been detected, the MCU 40 proceeds to S51 of FIG. 10 and starts the finger F position detection process.

When the MCU 40 determines at S22 that the active pen P has been detected, the MCU 40 performs the pen position determination process illustrated at S3 of FIG. 5. Specifically, the MCU 40 resets the candidate pen position table (S31). After the reset, no candidate pen position cP[i] is set in the candidate pen position table. Next, the MCU 40 acquires I (I=an integer of 1 or greater) candidate pen positions cP[i] (i=0 to I−1) detected at S21 and sets these candidate pen positions cP[i] in the candidate pen position table (S32). After that, the MCU 40 sequentially performs processes at S34 to S36 for each of all the candidate pen positions cP[i] (S33).

Specifically, the MCU 40 determines whether or not the touch position determination process at S8 has already been performed (S34). Without this process, all the candidate pen positions cP[i] would be determined as having no corresponding candidate touch positions cT[j] and, therefore, determined as invalid in S35 described later.

When the MCU 40 determines at S34 that the touch position determination process at S8 has already been performed, the MCU 40 determines whether or not there is any candidate touch position cT[j] substantially equal to the candidate pen position cP[i] (S35: a first determination process). When the MCU 40 determines that there is no such candidate touch position cT[j], the MCU 40 skips a process at S38 described later and proceeds to the next i. As a result, the corresponding definitive pen position fP[i] is set to NULL and the corresponding valid flag is set to "invalid." Performing S35 prevents a pen position from being detected in the touch region 5c when the pen tip of the active pen P is actually in the peripheral region 5d.

When the MCU 40 determines at S34 that the touch position determination process at S8 has not been performed or when the MCU 40 determines at S35 that there is a candidate touch position cT[j] substantially equal to the candidate pen position cP[i], the MCU 40 determines whether or not there is any definitive touch position fT[j] substantially equal to the candidate pen position cP[i] (S36: a second determination process). When the MCU 40 determines that there is a definitive touch position fT[j] substantially equal to the candidate pen position cP[i], the MCU 40 determines whether the region type of the definitive touch position fT[j] substantially equal to the candidate pen position cP[i] is "finger" or "palm" (S37).

When the MCU 40 determines at S36 that there is no definitive touch position fT[j] substantially equal to the candidate pen position cP[i] or when the MCU 40 determines at S37 that the region type is "finger," the MCU 40 sets the corresponding definitive pen position fP[i] to the candidate pen position cP[i] and the corresponding valid flag to "valid" (S38). After performing S38, the MCU 40 proceeds to the next i.

When the MCU 40 determines at S37 that the region type is "palm," the MCU 40 skips the process at S38 and proceeds to the next i. As a result, the corresponding definitive pen position fP[i] is set to NULL and the corresponding valid flag is set to "invalid."

When the processes at S34 to S38 have been completed for all the candidate pen positions cP[i], the MCU 40 outputs only the definitive pen position fP[i] with the corresponding valid flag set to "valid" to the host controller 2 as a pen position (S4), and then starts the finger F position detection process.

As illustrated in FIG. 10, the MCU 40 first performs the processes at S5 to S7 illustrated in FIG. 5 by performing processes at S51 and S52. Specifically, the MCU 40 performs detection of the finger F (S51) and determines whether or not the finger F has been detected as a result of the detection (S52). When the MCU 40 determines at S52 that the finger F has not been detected, the MCU 40 proceeds to S21 of FIG. 9 and starts the active pen P position detection process.

When the MCU 40 determines at S52 that the finger F has been detected, the MCU 40 performs the touch position determination process illustrated at S8 of FIG. 5. Specifically, the MCU 40 resets the touch position table (S81). After the reset, no candidate touch position cT[j] is set in the touch position table. Next, the MCU 40 acquires J (J=an integer of 1 or greater) candidate touch positions cT[j] (j=0 to J−1) detected at S51 and sets these candidate touch positions cT[j] in the touch position table (S82). After that, the MCU 40 sequentially performs processes at S84 to S87 for each of all the candidate touch positions cT[j] (S83).

Specifically, the MCU 40 calculates the area of the candidate touch position cT[j]. The area calculated here is an area of a region which includes the candidate touch position cT[j] and in which the amount of change in capacitance is equal to or greater than the predetermined amount. After that, the MCU 40 determines whether or not the calculated area is equal to or greater than the predetermined size (S84).

When the MCU 40 determines at S84 that the calculated area is equal to or greater than the predetermined size (i.e., area=large), the MCU 40 sets the definitive touch position fT[j] to the candidate touch position cT[j], the corresponding valid flag to "invalid," and the corresponding region type to "palm" (S85).

When the MCU 40 determines at S84 that the calculated area is not equal to or greater than the predetermined size (i.e., area=small), the MCU 40 determines whether or not a definitive pen position fP[i] substantially equal to the candidate touch position cT[j] is stored in the candidate pen position table (S86). When the MCU 40 determines that no definitive pen position fP[i] substantially equal to the candidate touch position cT[j] is stored, the MCU 40 sets the definitive touch position fT[j] to the candidate touch position cT[j], the corresponding valid flag to "valid," and the corresponding region type to "finger" (S87). When the MCU 40 determines at S86 that a definitive pen position fP[i] substantially equal to the candidate touch position cT[j] is stored, the MCU 40 skips the process at S87 and sets the corresponding definitive touch position fT[j] to NULL and the corresponding valid flag to "invalid."

When the processes at S84 to S87 have been completed for all the candidate touch positions cT[j], the MCU 40 outputs only the definitive touch position fT[j] with the corresponding valid flag set to "valid" to the host controller 2 as a touch position (S9). After that, the MCU 40 returns to S2 and starts the active pen P position detection process.

Hereinabove, the pen position determination process and the touch position determination process performed by the MCU 40 have been described again in more detail with reference to the process flow of the MCU 40.

Next, the electronic device 1 according to a second embodiment of the present disclosure will be described. The electronic device 1 according to the present embodiment is different from the electronic device 1 according to the first embodiment in that it detects a gesture performed by the active pen P in the bezel region 3b illustrated in FIG. 1. Although the electronic device 1 according to the present embodiment basically has a similar configuration to that of the electronic device 1 according to the first embodiment, it is different from the electronic device 1 according to the first embodiment in that it performs a process of detecting a gesture performed in the bezel region 3b between S4 and S5 illustrated in FIG. 5. The details will be described below, focusing on the difference.

Figure 11:
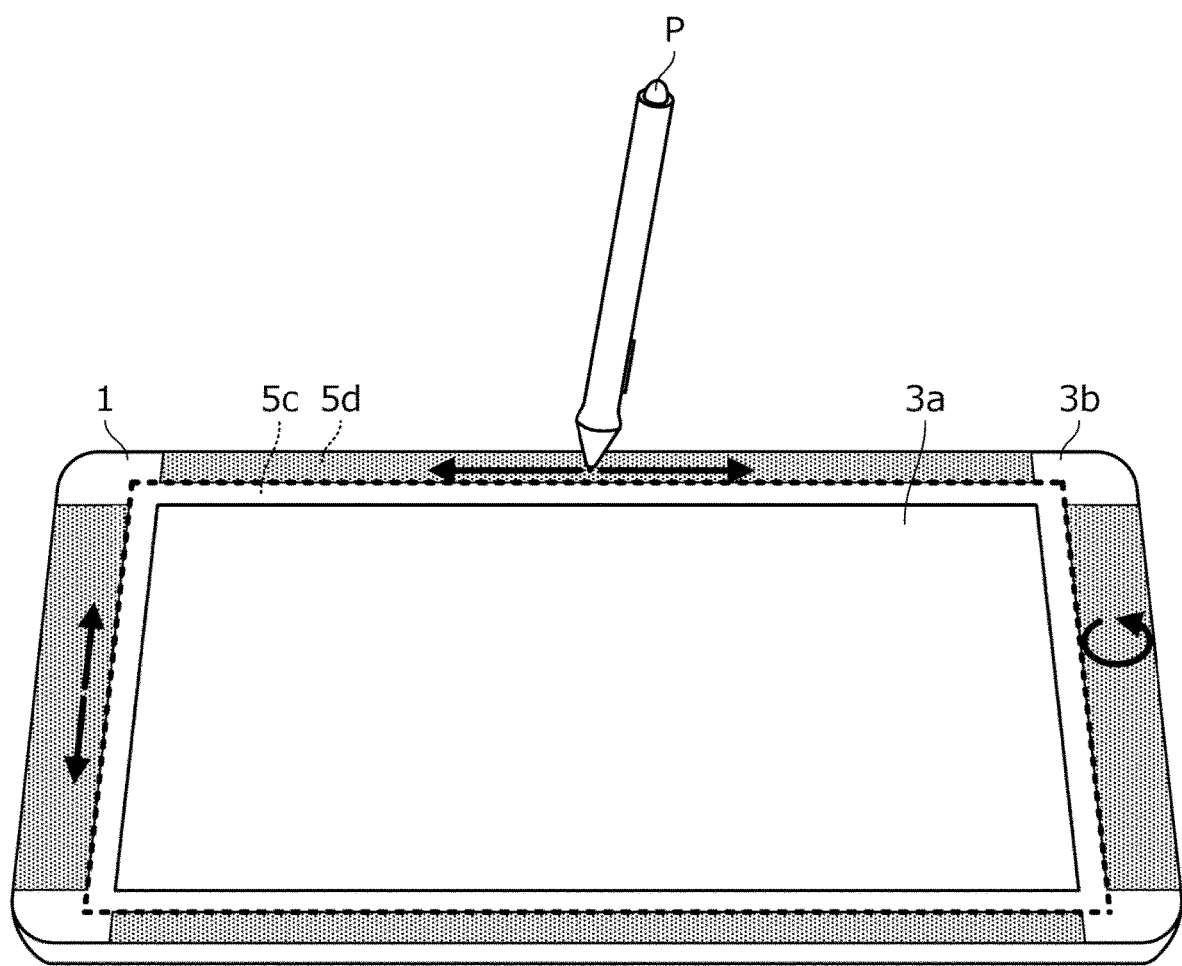
FIG. 11 is a view related to a second embodiment of the present disclosure and illustrating an example of a gesture detected in the peripheral region.

FIG. 11 is a view illustrating an example of a gesture detected in the peripheral region 5d. The sensor controller 4 of the electronic device 1 according to the present embodiment detects the movement of the pen tip of the active pen P when the pen tip moves in the peripheral region 5d as denoted by bold arrows in FIG. 11. Based on the detected movement, the sensor controller 4 determines whether or not a predetermined gesture has been performed. When the sensor controller 4 determines that the predetermined gesture has been performed, the sensor controller 4 notifies the host controller 2 of this gesture detection. The host controller 2, which preliminarily stores the types of gestures and contents of commands to be allocated to the gestures in association with each other, executes a command corresponding to the gesture notified by the sensor controller 4.

FIG. 12 is a table illustrating an example of specific types of gestures and commands allocated to the gestures. As illustrated in FIG. 12, the types of gestures include linear gestures and multidirectional gestures, for example. A linear gesture refers to a movement only in the x direction (the horizontal direction as seen by the user of the electronic device 1) or a movement only in the y direction (the vertical direction as seen by the user of the electronic device 1). A multidirectional gesture refers to a movement including both a movement in the x direction and a movement in y direction. Examples of the multidirectional gesture include a gesture indicated by a circular stroke, a gesture indicated by two intersecting strokes, and a gesture indicated by two parallel strokes. As a matter of course, since the active pen P is moved by a human, it is impossible for him or her to strictly move the active pen P only in the x or y direction or strictly input a circular stroke or two parallel strokes. Therefore, it is preferable that the sensor controller 4 tolerate error to some extent.

Preferably, a command for changing the amount of one dimension is allocated to a linear gesture, while a command for performing a single action is allocated to a multidirectional gesture. Examples of the command for changing the amount of one dimension include, as illustrated in linear gesture columns of FIG. 12, a command for changing a brush size (the thickness of a line drawn by the active pen P), a command for changing the contrast of the display region 3a, a command for scrolling the display in the right-left (R/L) direction in the display region 3a, a command for scrolling the display in the up-down (U/D) direction in the display region 3a, a command for changing the brush sharpness (the sharpness of a line drawn by the active pen P), and a command for changing the amount of rotation of the canvas (drawing region). Examples of the command for performing a single action include, as illustrated in a multidirectional gesture column of FIG. 12, a command for saving a file, a command for switching various tools, a command for setting the screen magnification to 100%, and a command for inverting a selected image.

Figure 13:
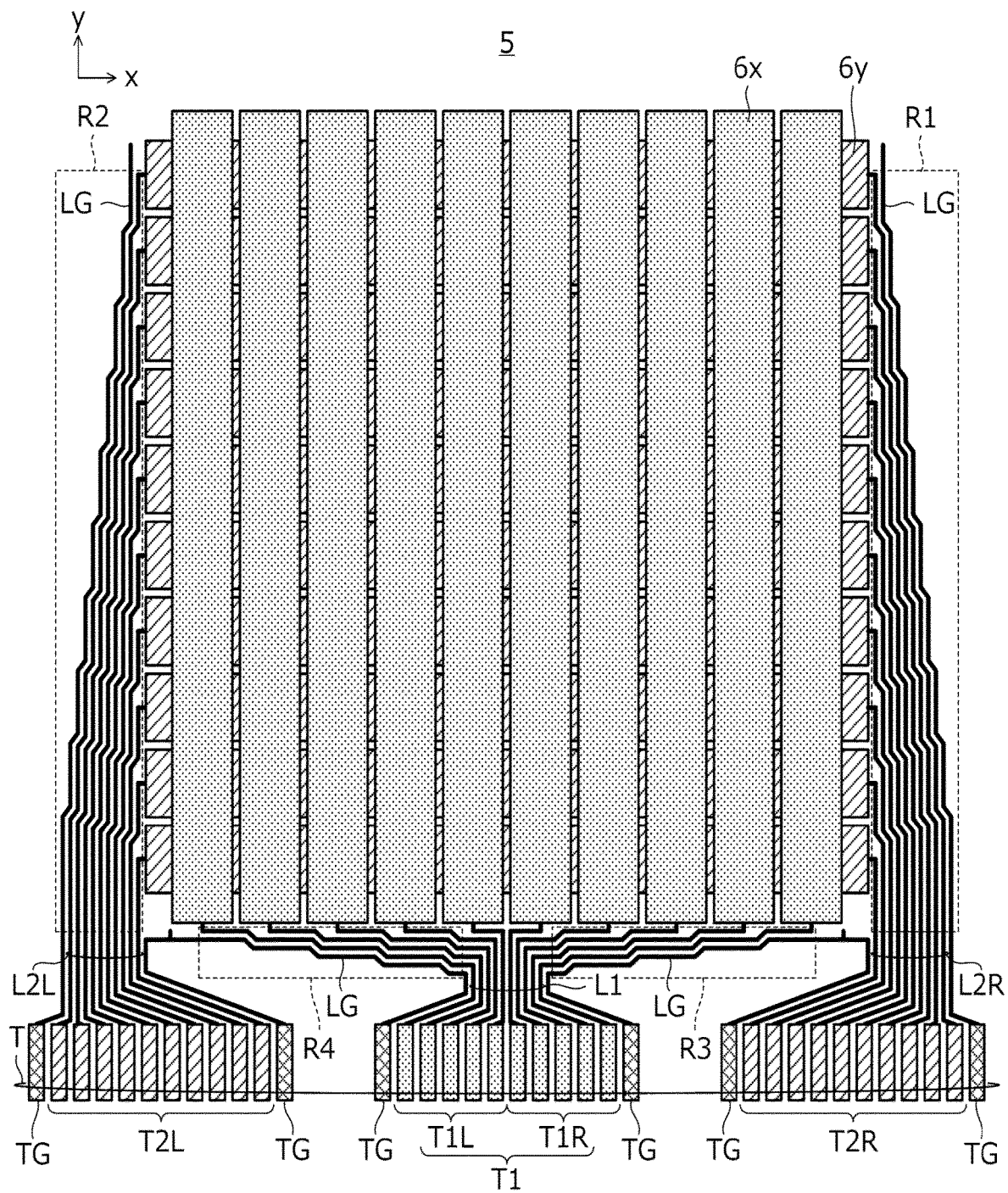
FIG. 13 is a view of gesture detectable regions set in the touch sensor illustrated in FIG. 2.

FIG. 13 is a view of gesture detectable regions R1 to R4 set in the touch sensor 5 illustrated in FIG. 2. As will be described in detail later, in the present embodiment, the sensor controller 4 detects a gesture by evaluating the level (reception intensity) of the downlink signal DS in each routing line in accordance with a predetermined rule. The predetermined rule is not applicable to the entire peripheral region 5d, but applicable only to part of the peripheral region 5d. Therefore, a region in which a gesture can be detected is also limited to part of the peripheral region 5d. The detectable regions R1 to R4 illustrated in FIG. 13 correspond to such limited regions. A specific gesture detection method will be described in detail below, taking the detectable region R1 as an example.

Figure 14:
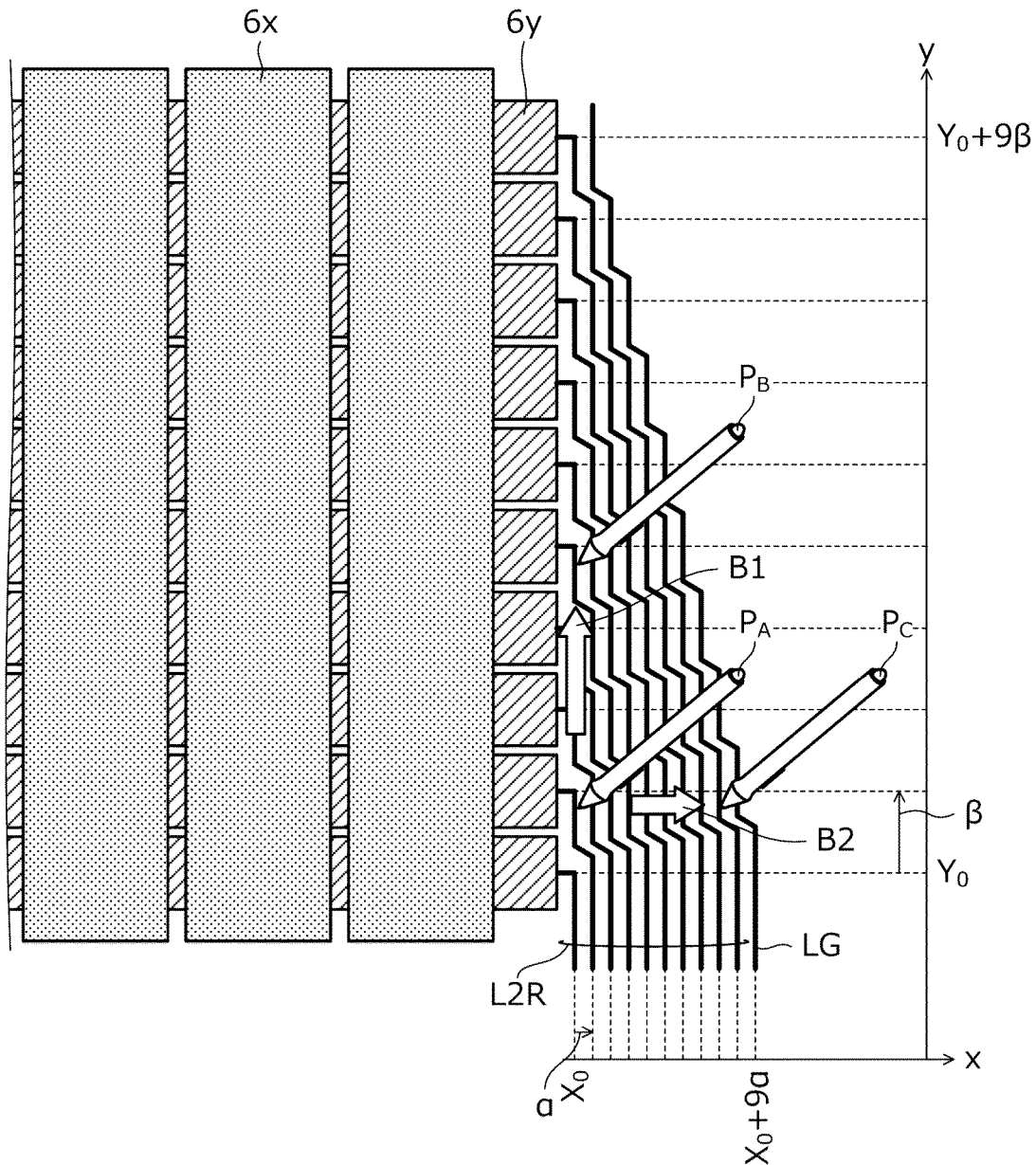
FIG. 14 is a view of the vicinity of one of the detectable regions extracted from FIG. 13.
Figure 15A:
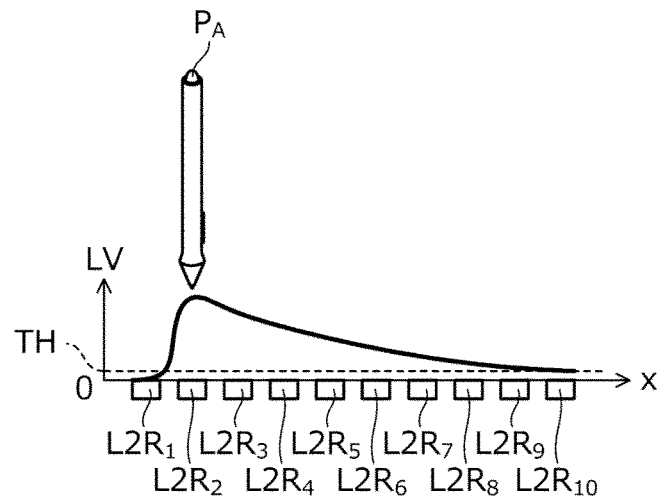
FIGS. 15A to 15C are schematic diagrams each illustrating a level in each routing line when the active pen is located at one of positions illustrated in FIG. 14.
Figure 15B:
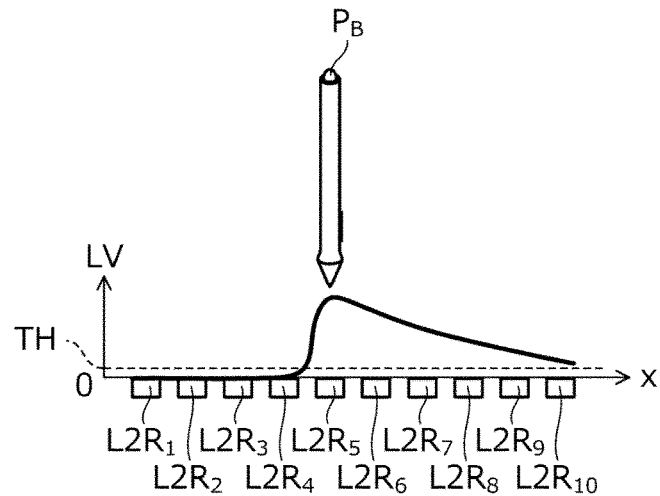
Figure 15C:
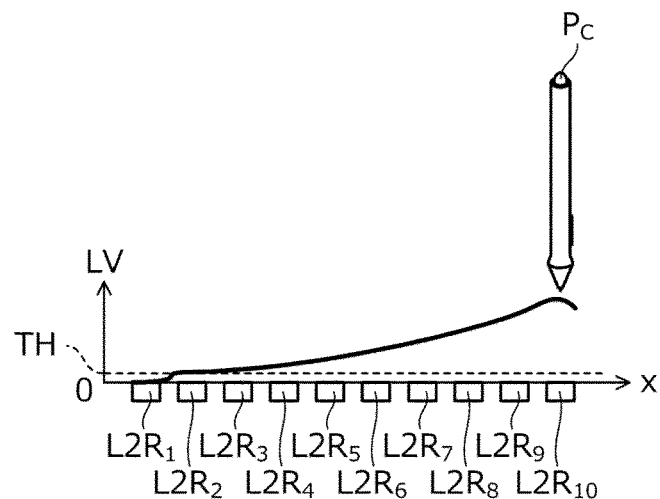

FIGS. 14 and 15 illustrate a principle of the gesture detection in the detectable region R1. FIG. 14 is a view of the vicinity of the detectable region R1 extracted from FIG. 13. For better illustration, the scale in the x direction is increased and the x-coordinate of each routing line L2R and the y-coordinate of each linear electrode 6y are illustrated in FIG. 14. FIGS. 15A to 15C are schematic diagrams each illustrating the level LV of the downlink signal DS in each routing line when the active pen P is located at one of positions $P_A$ to $P_C$ illustrated in FIG. 14. In FIGS. 15A to 15C, ten routing lines L2R illustrated in FIG. 14 are serially numbered with a subscript 1 to 10, in order from the routing line L2R connected to the lowermost linear electrode 6y in FIG. 14.

Referring to FIG. 15A, when the active pen P is located at the position $P_A$, the peak of the level LV is detected in the routing line $L2R_2$, and the level LV detected in each of nine routing lines $L2R_2$ to $L2R_{10}$ is equal to or higher than a predetermined value TH. The peak of the level LV is detected in the routing line $L2R_2$ because the routing line $L2R_2$ is closest to the position $P_A$. The level LV detected in the routing line $L2R_1$ is less than the predetermined value TH because the routing line $L2R_1$ does not extend to the y-coordinate position of the position $P_A$.

Referring to FIG. 15B, when the active pen P is located at the position $P_B$ (the position moved in the y direction from the position PA toward a direction away from the edge 5b illustrated in FIG. 1), the peak of the level LV is detected in the routing line $L2R_5$, and the level LV detected in each of six routing lines $L2R_5$ to $L2R_{10}$ is equal to or higher than the predetermined value TH. The peak of the level LV is detected in the routing line $L2R_5$ because the routing line $L2R_5$ is closest to the position $P_B$. The level LV detected in each of the routing lines $L2R_1$ to $L2R_4$ is less than the predetermined value TH because the routing lines $L2R_1$ to $L2R_4$ do not extend to the y-coordinate position of the position $P_B$.

Referring to FIG. 15C, when the active pen P is located at the position $P_C$ (the position moved in the x direction from the position $P_A$ toward the outside of the touch sensor 5), the peak of the level LV is detected in the routing line $L2R_{10}$, and the level LV detected in each of the nine routing lines $L2R_2$ to $L2R_{10}$ is equal to or higher than the predetermined value TH. The peak of the level LV is detected in the routing line $L2R_{10}$ because the routing line $L2R_{10}$ is closest to the position $P_C$. The level LV detected in the routing line $L2R_1$ is less than the predetermined value TH because the routing line $L2R_1$ does not extend to the y-coordinate position of the position $P_C$.

As understood from FIGS. 15A and 15B, as the active pen P is further away from the edge 5b in the y direction, the number of routing lines L2R in which the level LV of the downlink signal DS is less than the predetermined value TH increases. In a first table preliminarily stored in the sensor controller 4, the number of routing lines L2R in which the level LV is less than the predetermined value TH is associated with a corresponding y-coordinate of the position of the active pen P. Based on the number of routing lines L2R actually detected, the sensor controller 4 reads the y-coordinate of the position of the active pen P from the first table, thereby detecting the y-coordinate of the position of the active pen P.

A specific example of the first table is as illustrated in Table 1 below. In Table 1, the total number of routing lines L2R is assumed to be N. $Y_0$ and β in Table 1 represent variables illustrated in FIG. 14. Specifically, $Y_0$ represents the y-coordinate of the linear electrode 6y closest to the edge 5b (the lowermost linear electrode 6y in FIG. 14) while β represents an arrangement pitch of the linear electrodes 6y. By referring to Table 1, the sensor controller 4 identifies a record corresponding to the result of detection of the number of routing lines L2R in which the level LV is less than the predetermined value TH and acquires the y-coordinate included in the identified record. In this manner, the sensor controller 4 detects the y-coordinate of the position of the active pen P.

TABLE 1

| Number of routing lines L2R in which level LV is less than predetermined value TH | y-coordinate of position of active pen P |
|---|---|
| 0 | $Y_0$ |
| 1 | $Y_0 + β$ |
| 2 | $Y_0 + 2β$ |
| 3 | $Y_0 + 3β$ |
| . . . | . . . |
| N − 1 | $Y_0 + (N − 1) β$ |

As understood from FIGS. 15A and 15C, the peak of the level LV of the downlink signal DS appears in a different routing line L2R according to the position of the active pen P in the x direction. In order to know the x-coordinate of the position of the active pen P, it is necessary to know the y-coordinate of the position of the active pen P since the routing lines L2R extend stepwise as illustrated in FIG. 14. In a second table preliminarily stored in the sensor controller 4, each routing line L2R in which the peak of the level LV appears is associated with a corresponding x-coordinate of the position of the active pen P for each y-coordinate of the position of the active pen P. Based on the routing line L2R in which the peak has been actually observed, the sensor controller 4 reads the x-coordinate of the position of the active pen P from the second table, thereby detecting the x-coordinate of the position of the active pen P.

A specific example of the second table is as illustrated in Table 2 below. In Table 2, the total number of routing lines L2R is assumed to be N. $X_0$ and α in Table 2 represent variables illustrated in FIG. 14. Specifically, $X_0$ represents the x-coordinate of the routing line L2R closest to the touch region 5c in a region in which the N routing lines L2R are disposed side by side in the y direction, while a represents an arrangement pitch of the routing lines L2R. By referring to the first table, the sensor controller 4 first detects the y-coordinate of the position of the active pen P. After that, the sensor controller 4 refers to a portion corresponding to the detected y-coordinate in Table 2. In the portion being referred to, the sensor controller 4 identifies a record corresponding to the routing line L2R in which the peak of the level LV has appeared and acquires the x-coordinate included in the identified record. In this manner, the sensor controller 4 detects the x-coordinate of the position of the active pen P.

TABLE 2

| y-coordinate of position of active pen P | Routing line L2R in which peak of level LV appears | x-coordinate of position of active pen P |
|---|---|---|
| $Y_0$ | $L2R_1$ | $X_0$ |
|  | $L2R_2$ | $X_0 + 2\alpha$ |
|  | ... | ... |
|  | $L2R_N$ | $X_0 + (N-1)\alpha$ |
| $Y_0 + \beta$ | $L2R_2$ | $X_0$ |
|  | $L2R_3$ | $X_0 + 2\alpha$ |
|  | ... | ... |
|  | $L2R_N$ | $X_0 + (N-2)\alpha$ |
| ... | ... | ... |
| $Y_0 + (N-1)\beta$ | $L2R_N$ | $X_0$ |

In this manner, the sensor controller 4 can roughly detect the position of the active pen P in the detectable region R1 by evaluating the level LV of the downlink signal DS in each routing line in accordance with the predetermined rule (the first and second tables). Therefore, the sensor controller 4 can detect a gesture performed by the active pen P by performing the above-described detection multiple times and detecting the movement of the position of the active pen P from a result of this detection. The sensor controller 4 can also detect a gesture performed by the active pen P in the other detectable regions R2 to R4 by performing similar processes.

FIG. 16 is a flowchart illustrating a gesture detection process (gesture detection) performed by the sensor controller 4 according to the present embodiment. As understood from FIG. 16, this process is performed between S4 and S5 illustrated in FIG. 5.

As illustrated in FIG. 16, the sensor controller 4 stores the level of the downlink signal DS received at S2 of FIG. 5 for each routing line (S100). Since the level of the downlink signal DS is stored for each routing line, the levels detected in two respective routing line L2L and L2R are separately stored even if these routing lines L2L and L2R are connected to the same linear electrode 6y, for example.

Next, the sensor controller 4 determines whether or not a pen position has been output at S4 of FIG. 5 (S101). When the sensor controller 4 determines that a pen position has been output, the sensor controller 4 ends the gesture detection process and proceeds to the process at S5 of FIG. 5. When the sensor controller 4 determines that no pen position has been output, the sensor controller 4 proceeds to a process at S102. By performing S101, the sensor controller 4 can detect a gesture in the bezel region 3b only when no pen input has been performed by the active pen P.

At S102, the sensor controller 4 determines whether or not the downlink signal DS has been detected only in routing lines corresponding to any one of the preliminarily set detectable regions R1 to R4. In making this determination, if the downlink signal DS has been detected in both routing lines L2L and L2R connected to the same linear electrode 6y, the sensor controller 4 preferably considers that the downlink signal DS has not been detected in either one of the routing lines L2L and L2R in which the level of the downlink signal DS is weaker.

When the sensor controller 4 determines at S102 that the downlink signal DS has not been detected in routing lines corresponding to any of the detectable regions R1 to R4, the sensor controller 4 ends the gesture detection process and proceeds to the process at S5 of FIG. 5. When the sensor controller 4 determines at S102 that the downlink signal DS has been detected in routing lines corresponding to one of the detectable regions R1 to R4, the sensor controller 4 detects the position of the active pen P in accordance with the rule (the first and second tables described above) corresponding to the detectable region in which the downlink signal DS had been detected, and stores the position of the active pen P in the memory of the sensor controller 4 (S103).

Next, the sensor controller 4 attempts to detect a gesture based on the positions stored through the process at S103 performed multiple times so far and determines whether or not any gesture performed by the active pen P has been detected as a result of this attempt (S104). When the sensor controller 4 determines that a gesture performed by the active pen P has been detected, the sensor controller 4 outputs information indicating the detected gesture to the host controller 2 (S105). When the process at S105 has been completed or when the sensor controller 4 determines at S104 that no gesture has been detected, the sensor controller 4 ends the gesture detection process and proceeds to the process at S5 of FIG. 5.

As described above, the pointer position detection method and the sensor controller 4 according to the present embodiment can detect a gesture of the active pen P performed in the bezel region 3b. With this configuration, various menus can be operated with gestures in the bezel region 3b. This configuration, in turn, helps to reduce the occurrence of erroneous operations caused by pen inputs.

Although the preferred embodiments of the present disclosure have been described, it is to be understood that the present disclosure is not limited to the above-described embodiments and may be implemented in various embodiments without departing from the scope of the present disclosure.

For example, in the second embodiment, a gesture is detected in the bezel region 3b based on the level of the downlink signal DS received in each routing line disposed in the peripheral region 5d. Alternatively, if an overlap region between the touch region 5c and the bezel region 3b is sufficiently large, a gesture may be detected in the bezel region 3b based on the level of the downlink signal DS received in each sensor electrode 6 disposed at edge portions of the touch region 5c.

Further, each routing line may include a pad portion and another portion other than the pad portion, and the pad portion may be wider than another portion. With this configuration, the level LV of the downlink signal DS can be increased in each routing line. Accordingly, a gesture can be detected in the bezel region 3b in a more preferable manner.

What is claimed is:

1. A pointer position detection method for detecting, using a touch sensor including a plurality of sensor electrodes, a touch position indicated by a passive pointer that does not transmit a signal and a pen position indicated by an active pen configured to transmit a downlink signal from a pen electrode disposed in a distal end of the active pen, the pointer position detection method performed by a sensor controller connected to the touch sensor, the pointer position detection method comprising:

detecting one or more candidate pen positions based on a level of the downlink signal in each of the plurality of sensor electrodes;

determining the pen position in an active region at least partially surrounded by a bezel region of a display device from the one or more candidate pen positions; and detecting a gesture performed by the active pen in the bezel region of the display device, wherein the touch sensor includes a plurality of routing lines each connecting a corresponding one of the plurality of sensor electrodes to the sensor controller, and wherein the detecting the gesture includes detecting the gesture based on the level of the downlink signal in each of the plurality of routing lines.

2. The pointer position detection method according to claim 1, wherein the detecting the gesture is performed when no pen position has been detected in the active region surrounded by the bezel region.

3. The pointer position detection method according to claim 1, wherein a peripheral region of the touch sensor includes a plurality of detectable regions arranged based on an arrangement of the plurality of routing lines, and the detecting the gesture includes detecting a position indicated by the active pen in the bezel region by evaluating the level of the downlink signal in each of the plurality of routing lines in accordance with a rule set for each of the plurality of detectable regions, and detecting the gesture based on the position detected.

4. The pointer position detection method according to claim 3, wherein each of the plurality of routing lines includes a pad portion and a portion other than the pad portion, and the pad portion is wider than the portion other than the pad portion.

5. A sensor controller that is connected to a touch sensor including a plurality of sensor electrodes and is configured to detect, using the touch sensor, a touch position indicated by a passive pointer that does not transmit a signal and a pen position indicated by an active pen configured to transmit a downlink signal from a pen electrode disposed in a distal end of the active pen, the sensor controller comprising:

a processor; and a memory storing instructions that, when executed by the processor, cause the sensor controller to:

detect one or more candidate pen positions based on a level of the downlink signal in each of the plurality of sensor electrodes;

determine the pen position in an active region at least partially surrounded by a bezel region of a display device from the one or more candidate pen positions; and detect a gesture performed by the active pen in the bezel region of the display device, wherein the touch sensor includes a plurality of routing lines each connecting a corresponding one of the plurality of sensor electrodes to the sensor controller, and wherein the instructions, when executed by the processor, cause the sensor controller to detecting the gesture based on the level of the downlink signal in each of the plurality of routing lines.

6. The sensor controller according to claim 5, wherein the instructions, when executed by the processor, cause the sensor controller to detect the gesture when no pen position has been detected in the active region surrounded by the bezel region.

7. The sensor controller according to claim 5, wherein a peripheral region of the touch sensor includes a plurality of detectable regions arranged based on an arrangement of the plurality of routing lines, and wherein the instructions, when executed by the processor, cause the sensor controller to detect the gesture by detecting a position indicated by the active pen in the bezel region by evaluating the level of the downlink signal in each of the plurality of routing lines in accordance with a rule set for each of the plurality of detectable regions, and detecting the gesture based on the position detected.

8. The sensor controller according to claim 7, wherein each of the plurality of routing lines includes a pad portion and a portion other than the pad portion, and the pad portion is wider than the portion other than the pad portion.

* * * * *